(12) United States Patent
Baek et al.

(10) Patent No.: US 10,051,096 B2
(45) Date of Patent: Aug. 14, 2018

(54) BATTERY PACK MOUNTING STRUCTURE AND ELECTRONIC DEVICE HAVING THE SAME

(71) Applicant: Samsung Electronics Co., Ltd., Suwon-si (KR)

(72) Inventors: Sangin Baek, Suwon-si (KR); Bongsuk Choi, Seoul (KR); Gyeongtae Kim, Suwon-si (KR); Heecheul Moon, Seongnam-si (KR); Minsung Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/996,149

(22) Filed: Jan. 14, 2016

(65) Prior Publication Data

US 2016/0234361 A1    Aug. 11, 2016

Related U.S. Application Data

(60) Provisional application No. 62/113,108, filed on Feb. 6, 2015.

(30) Foreign Application Priority Data

Apr. 29, 2015 (KR) .................. 10-2015-0060708

(51) Int. Cl.
*H04M 1/02* (2006.01)

(52) U.S. Cl.
CPC ........ *H04M 1/0262* (2013.01); *H04M 1/0266* (2013.01); *H04M 1/0277* (2013.01); *H04M 2001/0204* (2013.01)

(58) Field of Classification Search
CPC ............. H04M 1/0262; H04M 1/0266; H04M 1/0277; H04M 2001/0204; H04B 1/3883
(Continued)

(56) References Cited

U.S. PATENT DOCUMENTS 5,176,733 A    1/1993  Koss
8,737,045 B2   5/2014  Dai
(Continued)

FOREIGN PATENT DOCUMENTS

CN    101727234 A    6/2010
CN    102110887 A    6/2011
(Continued)

OTHER PUBLICATIONS

Int'l Search Report for PCT/KR2016/000372 dated Apr. 27, 2016.
(Continued)

*Primary Examiner* — Charles Shedrick
(74) *Attorney, Agent, or Firm* — McAndrews, Held & Malloy, Ltd.

(57) ABSTRACT

Disclosed is a portable electronic device that includes: a front glass cover that forms a front face of the electronic device; a rear cover that forms a rear face of the electronic device; a side portion that surrounds a space formed by the front glass cover and the rear cover; a display module embedded in the space and including a screen region that is exposed through the front glass cover; a printed circuit board (PCB) interposed between the display module and the rear cover, and including an opening that is at least partially closed; a battery installed within the opening and interposed between the display module and the rear cover; and a power control module (PCM) interposed between the PCB and the display module, and arranged adjacent to a side of the battery when viewed from a position above the PCB.

16 Claims, 18 Drawing Sheets

(58) Field of Classification Search
USPC .......................................................... 455/566
See application file for complete search history.

(56) References Cited

U.S. PATENT DOCUMENTS

| | | | |
|---|---|---|---|
| 9,047,044 B2 | 6/2015 | Raff | |
| 9,454,179 B2 | 9/2016 | Shin et al. | |
| 9,557,770 B2 | 1/2017 | Shin et al. | |
| 9,578,149 B2 | 2/2017 | Moon et al. | |
| 2003/0103510 A1* | 6/2003 | Svanberg | H04L 12/4633 370/395.2 |
| 2006/0089171 A1* | 4/2006 | Yoo | H04M 1/0262 455/557 |
| 2009/0040115 A1 | 2/2009 | Zhang et al. | |
| 2009/0256759 A1 | 10/2009 | Hill et al. | |
| 2010/0315769 A1 | 12/2010 | Mathew | |
| 2011/0228494 A1 | 9/2011 | Xiao | |
| 2011/0241949 A1 | 10/2011 | Nickel et al. | |
| 2011/0287812 A1 | 11/2011 | Joo | |
| 2012/0013510 A1 | 1/2012 | Yagi et al. | |
| 2012/0021701 A1 | 1/2012 | Wong et al. | |
| 2012/0044123 A1 | 2/2012 | Rothkopf | |
| 2012/0050962 A1 | 3/2012 | Hsiung | |
| 2012/0178503 A1 | 7/2012 | Merz | |
| 2013/0250504 A1* | 9/2013 | Choi | G06F 1/203 361/679.26 |
| 2013/0300697 A1 | 11/2013 | Kim et al. | |
| 2013/0303092 A1* | 11/2013 | Penafiel | A61N 1/16 455/73 |
| 2013/0318766 A1 | 12/2013 | Kiple et al. | |
| 2013/0323579 A1 | 12/2013 | Hwang et al. | |
| 2014/0085836 A1 | 3/2014 | Mo et al. | |
| 2014/0091983 A1 | 4/2014 | Nakano et al. | |
| 2014/0099527 A1 | 4/2014 | Seong et al. | |
| 2014/0111927 A1 | 4/2014 | Raff | |
| 2014/0153211 A1 | 6/2014 | Malek et al. | |
| 2014/0198436 A1 | 7/2014 | Lim et al. | |
| 2014/0228080 A1 | 8/2014 | Choi et al. | |
| 2014/0233170 A1 | 8/2014 | Hobson et al. | |
| 2014/0234581 A1 | 8/2014 | Immerman | |
| 2014/0267097 A1 | 9/2014 | Lee et al. | |
| 2014/0307370 A1 | 10/2014 | Zadesky et al. | |
| 2014/0323063 A1 | 10/2014 | Xu et al. | |
| 2014/0335322 A1 | 11/2014 | Luo et al. | |
| 2014/0361671 A1 | 12/2014 | Degner et al. | |
| 2014/0367237 A1 | 12/2014 | Taylor | |
| 2014/0368228 A1 | 12/2014 | Kim | |
| 2015/0007501 A1 | 1/2015 | Liang | |
| 2015/0070236 A1 | 3/2015 | Walters et al. | |
| 2015/0070825 A1 | 3/2015 | Perko | |
| 2015/0140291 A1 | 5/2015 | Kim | |
| 2015/0155614 A1 | 6/2015 | Youn et al. | |
| 2016/0182112 A1 | 6/2016 | Kim et al. | |
| 2017/0041443 A1* | 2/2017 | Rostami | H04M 1/72575 |
| 2017/0060182 A1 | 3/2017 | Shin et al. | |

FOREIGN PATENT DOCUMENTS

| | | |
|---|---|---|
| CN | 202262106 U | 5/2012 |
| CN | 102684722 A | 9/2012 |
| CN | 103458641 | 12/2013 |
| CN | 103685627 A | 3/2014 |
| CN | 103702540 A | 4/2014 |
| CN | 103987218 A | 8/2014 |
| CN | 103987223 A | 8/2014 |
| EP | 2498336 | 9/2012 |
| EP | 2498336 A2 | 9/2012 |
| EP | 2533502 A1 | 12/2012 |
| EP | 2709283 A1 | 3/2014 |
| KR | 100716761 B1 | 5/2007 |
| KR | 20080043998 A | 5/2008 |
| KR | 10-2010-0136719 A | 12/2010 |
| KR | 10-2011-0006039 A | 1/2011 |
| KR | 20110080630 A | 7/2011 |
| KR | 10-2011-0127483 A | 11/2011 |
| KR | 10-2013-0015535 A | 2/2013 |
| KR | 20130014784 A | 2/2013 |
| KR | 101279793 B1 | 6/2013 |
| KR | 10-2013-0099499 A | 9/2013 |
| KR | 10-2013-0127050 A | 11/2013 |
| KR | 20140101240 A | 8/2014 |
| WO | 2015001181 A1 | 1/2015 |

OTHER PUBLICATIONS

Int'l Search Report for PCT/KR2016/000383 dated Apr. 28, 2016.
Extended European Search Report for EP16150482.4 dated May 20, 2016.
Extended European Search Report for EP16151140.7 dated May 30, 2016.
Extended European Search Report for EP16150921.1 dated Jun. 3, 2016.
Thomas Halleck: "Samsung Will Release Galaxy S6 With Two Curved Edges, A Glass Back and Non-Removable Battery, Reports Say", Jan. 20, 2015 (Jan. 20, 2015), XP055271607, Retrieved from the Internet: URL:http://www.ibtimes.com/samsung-will-release-galaxy-s6-two-curvededges-glass-back-non-removable-battery-1788104 [retrieved on May 10, 2016].
Michael Maier: "MWC: Samsung teased Galaxy S6 Edge an I TechStage", Feb. 3, 2015 (Feb. 3, 2015), XP055271738, Retrieved from the Internet: URL:http://www.techstage.de/news/MWC-Samsung-teasert-Galaxy-S6-Edge-an-2535441.html [retrieved on May 11, 2016].
Mark Prigg: "Samsung's Galaxy S6 will have curved screens that cover its sides I Daily Mail Online", Jan. 21, 2015 (Jan. 21, 2015), XP055271817, Retrieved from the Internet: URL:http://www.dailymail.co.uk/sciencetech/article-2918936/Samsung-sGalaxy-S6-curved-screens-cover -sides-special-editio n-handset -setApple-s-i Phone-6. Html [retrieved on May 11, 2016].
Non-Final Office Action dated Aug. 30, 2017, U.S. Appl. No. 15/402,695.
Seng, Hands on Xiaomi Mi Note, Jan. 2015 http://www.hardwarezone.com.sg/feature-hands-xiaomi-mi-note.
YouTube, Motorola Moto X (2nd Gen), 2014 https://www.youtube.com/watch?v=v8XJyOa4IG8.
Non-Final Office Action dated Jun. 13, 2017, U.S. Appl. No. 15/017,163.
Non-Final Office Action dated Sep. 7, 2017 corresponding to U.S. Appl. No. 14/997,126.
Office Action dated Nov. 6, 2017 corresponding to Chinese Application No. CN201610023927.6.
Non-Final Office Action dated Nov. 17, 2017 corresponding to U.S. Appl. No. 15/017,163.
Notice of Allowance dated Oct. 13, 2016 corresponding to U.S. Appl. No. 14/994,546.
Extended European Search Rreport dated Mar. 6, 2018 corresponding to European Patent Application No. 17209860.0.
Office Action dated Jun. 7, 2018 corresponding to Australian Application No. 2016216322.
Office Action dated May 23, 2018 corresponding to Chinese Application No. CN201610023927.6.
Office Action dated May 25, 2018 corresponding to Chinese Application No. CN201610028066.0.
Office Action dated Jun. 21, 2018 corresponding to Chinese Application No. CN201610027955.5.
Final Office Action dated Apr. 18, 2018 corresponding to U.S. Appl. No. 15/402,695.
Samsung to Release New 4.99 Inch Touch Screen Phone, http://tekarticles.com/article/samsung-to-release-new-4-99-inch-touch-screen-phone-906/.

* cited by examiner

BATTERY PACK MOUNTING STRUCTURE AND ELECTRONIC DEVICE HAVING THE SAME

RELATED APPLICATION(S)

This application claims priority from and the benefit under 35 U.S.C. § 119(a) to a U.S. Provisional Patent Application Ser. No. 62/113,108, filed on Feb. 6, 2015, and Korean Patent Application No. 10-2015-0060708, filed on Apr. 29, 2015, which are hereby incorporated by reference for all purposes as if fully set forth herein.

BACKGROUND

Various embodiments of the present disclosure relate to an electronic device. For example, various embodiments of the present disclosure relate to a battery pack mounting structure and an electronic device to which the battery pack mounting structure is applied.

As the functional differences between electronic devices of respective manufacturers have recently been greatly reduced, the electronic devices are being gradually slimmed in order to satisfy consumers' purchasing needs. Electronic devices are becoming increasingly more rigid and have strengthened design features. Various structures (e.g., exteriors) of the electronic devices are at least partially implemented by using a metal material so as to appeal to the luxuriousness and elegance of the exteriors of electronic devices.

Further, mounting structures for various accessories, which are essentially arranged within the electronic devices, tend to be diversified in order to maintain the performance of the electronic devices to be equal to those of the existing electronic devices or to further improve the performance of the electronic devices while trying to slim electronic devices.

A conventional electronic device may be equipped with a simple rectangular battery pack therein. The battery pack may include a battery cell, and may also include a Power Control Module (PCM) unit having a uniform thickness above the battery cell. Since the PCM unit is arranged in parallel to a peripheral printed circuit board (PCB), a corresponding portion of the PCB is cut due to the volume occupied by the PCM unit. Thus, PCB signal wiring space becomes insufficient.

SUMMARY

Various embodiments of the present disclosure may provide a battery pack mounting structure and an electronic device, to which the battery pack mounting structure is applied.

Various embodiments may provide a battery pack mounting structure that is implemented such that a PCB wiring space can be enhanced by securing an efficient amount of mounting space for the battery pack, and an electronic device, to which the battery pack mounting structure is applied.

Various embodiments may provide a battery pack mounting structure that is implemented such that a battery cell mounting efficiency can be enhanced by securing an efficient amount of mounting space for the battery pack, and an electronic device, to which the battery pack mounting structure is applied.

According to various embodiments, there is provided a portable electronic device including: a front glass cover that forms a front face of the electronic device; a rear cover that forms a rear face of the electronic device; a side portion that surrounds a space formed by the front glass cover and the rear cover; a display module positioned in the space and including a screen region that is exposed through the front glass cover; a printed circuit board (PCB) interposed between the display module and the rear cover, and including an opening that may be at least partially closed; a battery positioned within the opening and interposed between the display module and the rear cover; and a power control module (PCM) interposed between the PCB and the display module, and arranged adjacent to a side of the battery when viewed from a position above the PCB.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
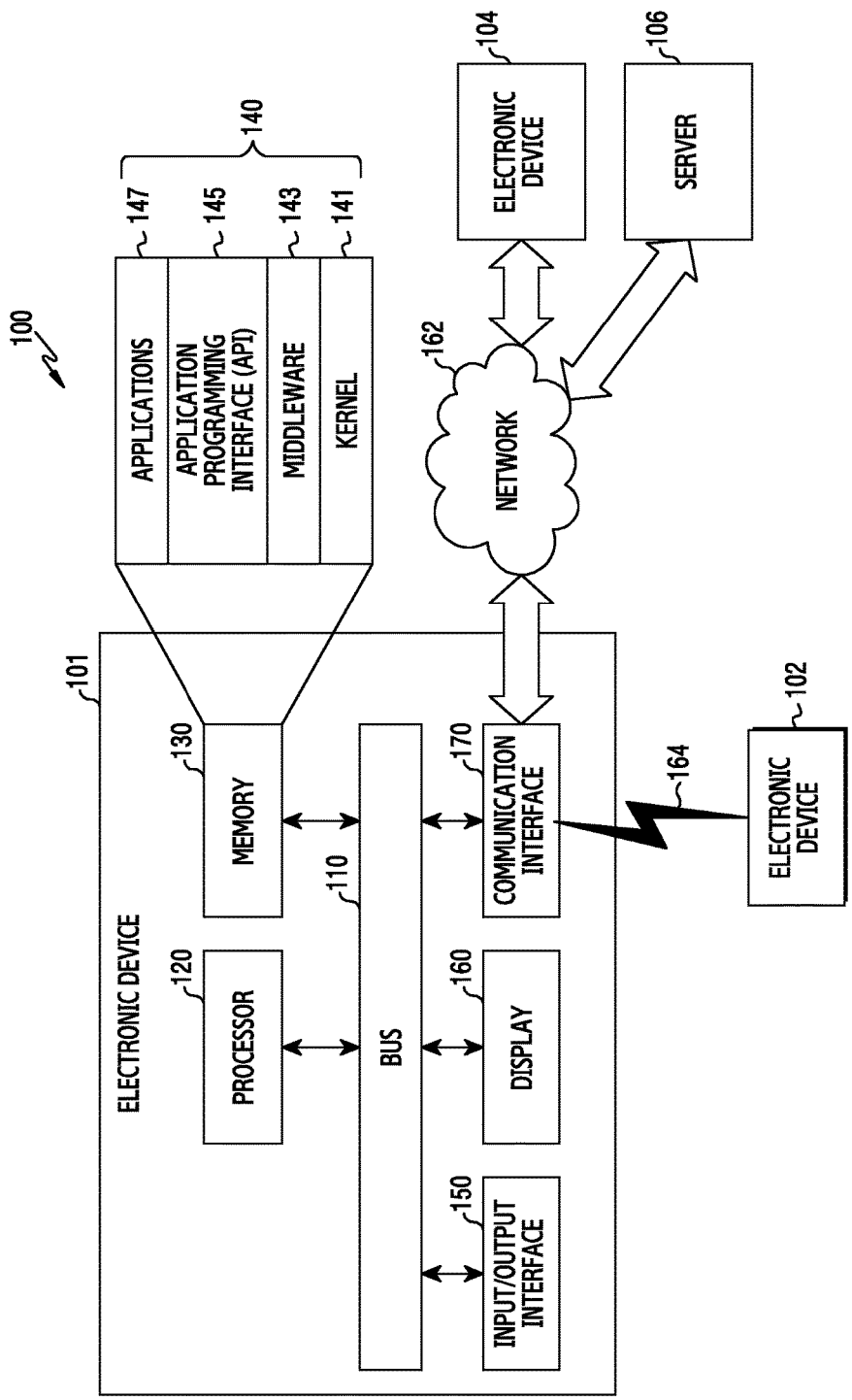
FIG. 1 is a view illustrating a network environment including an electronic device according to various embodiments of the present disclosure.

The following description, with reference to the accompanying drawings, is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially," it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

The terms "have," "may have," "include," or "may include" as used herein indicate the presence of disclosed corresponding functions, operations, elements, and the like, and do not limit additional one or more functions, operations, elements, and the like. In addition, the terms "include" or "have" indicate the presence of features, numbers, operations, elements, parts, or a combination thereof described in the specifications, and do not preclude the presence or addition of one or more other features, numbers, operations, elements, parts, or a combination thereof.

The terms "A or B," "at least one of A or/and B" or "one or more of A or/and B" as used herein include any and all combinations of words enumerated with it. For example, "A or B," "at least one of A and B" or "at least one of A or B" describes (1) including A, (2) including B, or (3) including both A and B.

Although terms, such as "first" and "second" as used herein may modify various elements of various embodiments of the present disclosure, these terms do not limit the corresponding elements. For example, these terms do not limit an order and/or importance of the corresponding elements. These terms may be used for the purpose of distinguishing one element from another element. For example, a first user device and a second user device both indicate user devices and may indicate different user devices. For example, a first element may be named a second element without departing from the scope of the present disclosure, and similarly, a second element may be named a first element.

When an element (e.g., a first element) is "connected to" or "(operatively or communicatively) coupled with/to" another element (e.g., a second element), the first element may be directly connected or coupled to the second element, and there may be an intervening element (e.g., a third element) between the first element and the second element. To the contrary, when an element (e.g., the first element) is "directly connected" or "directly coupled" to another element (e.g., the second element), there is no intervening element (e.g., the third element) between the first element and the second element.

The expression "configured to (or set to)" as used herein may be replaced with "suitable for," "having the capacity to," "designed to," "adapted to," "made to," or "capable of" according to the situation. The term "configured to (set to)" does not necessarily indicate "specifically designed to" in a hardware level. Instead, the expression "apparatus configured to . . . " may indicate that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments of the present disclosure and are not intended to limit the present disclosure. Further, all the terms used herein, including technical and scientific terms, should be interpreted to have the same meanings as commonly understood by those skilled in the art to which the present disclosure pertains, and should not be interpreted to have ideal or excessively formal meanings, unless explicitly defined herein.

A module or programming module, according to various embodiments of the present disclosure, may further include at least one or more constituent elements among the aforementioned constituent elements, or may omit some of them, or may further include additional constituent elements. Operations performed by a module, programming module, or other constituent elements may be executed in a sequential, parallel, repetitive, or heuristic manner. In addition, some of the operations may be executed in a different order or may be omitted, or other operations may be added.

An electronic device, according to various embodiments of the present disclosure, may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer 3 (MP3) player, a mobile medical device, a camera, or a wearable device (e.g., a head-mounted-device (HMD), an electronic glasses, an electronic clothing, an electronic bracelet, an electronic necklace, an electronic appcessory, an electronic tattoo, a smart mirror, a smart watch, and the like).

An electronic device may also be a smart home appliance. For example, smart home appliances may include at least one of a television (TV), a digital versatile disc (DVD) player, an audio component, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV), a game console (e.g., Xbox® PlayStation®), an electronic dictionary, an electronic key, a camcorder, an electronic frame, and the like.

An electronic device may also include at least one of a medical equipment (e.g., a mobile medical device (e.g., a blood glucose monitoring device, a heart rate monitor, a blood pressure monitoring device, a temperature meter, and the like), a magnetic resonance angiography (MRA) machine, a magnetic resonance imaging (MRI) machine, a computed tomography (CT) scanner, an ultrasound machine, and the like), a navigation device, a global positioning system (GPS) receiver, an event data recorder (EDR), a flight data recorder (FDR), an in-vehicle infotainment device, an electronic equipment for a ship (e.g., a ship navigation equipment and/or a gyrocompass), an avionics equipment, a security equipment, a head unit for vehicle, an industrial or home robot, an automatic teller machine (ATM), point of sale (POS) device, or an internet of things device (e.g., a light bulb, various sensors, an electronic meter, a gas meter, a sprinkler, a fire alarm, a thermostat, a streetlamp, a toaster, a sporting equipment, a hot-water tank, a heater, a boiler, and the like)

An electronic device may also include at least one of a piece of furniture or a building/structure, an electronic board, an electronic signature receiving device, a projector, and various measuring instruments (e.g., a water meter, an electricity meter, a gas meter, a wave meter, and the like).

An electronic device may also include a combination of one or more of the above-mentioned devices. Further, it will be apparent to those skilled in the art that an electronic device is not limited to the above-mentioned examples.

Herein, the term "user" may indicate a person who uses an electronic device or a device (e.g., an artificial intelligence electronic device) that uses the electronic device.

An electronic device of a single radio environment can provide long-term evolution (LTE) service using circuit switched fall back (CSFB) which determines whether paging information of a circuit switched (CS) service network is received over an LTE network. When receiving a paging signal of the CS service network over the LTE network, the electronic device connects (or accesses) the CS service network (e.g., a 2nd generation (2G)/3rd generation (3G) network) and provides a voice call service. For example, the 2G network can include one or more of a global system for mobile communications (GSM) network and a code division multiple access (CDMA) network. The 3G network can include one or more of a wideband-CDMA (WCDMA) network, a time division-synchronous CDMA (TD-SCDMA) network, and an evolution-data optimized (EV-DO) network.

Alternatively, the electronic device of the single radio environment can provide LTE service using single radio LTE (SRLTE) which determines whether the paging information is received by periodically switching every radio resource (e.g., receive antennas) to the CS service network (e.g., the 2G/3G network). Upon receiving the paging signal of the CS service network, the electronic device provides the voice call service by connecting the CS service network (e.g., the 2G/3G network).

Alternatively, the electronic device of the single radio environment can provide LTE service using single radio dual system (SRDS), which determines whether the paging information is received by periodically switching some of radio resources (e.g., receive antennas) to the CS service network (e.g., the 2G/3G network). Upon receiving the paging signal of the CS service network, the electronic device provides the voice call service by connecting the CS service network (e.g., the 2G/3G network).

FIG. 1 is a block diagram of a configuration of a network environment including an electronic device according to various embodiments of the present disclosure.

Referring to FIG. 1, an electronic device 101 includes a bus 110, a processor 120, a memory 130, an input/output interface 150, a display 160, and a communication interface 170. In various embodiments of the present disclosure, the electronic device 100 can omit at least one of the components or further include another component.

The bus 110 includes a circuit for connecting the components (e.g., the processor 120, the memory 130, the input/output interface 150, the display 160, and the communication interface 170) and delivering communications (e.g., a control message) therebetween.

The processor 120 includes one or more of a CPU, an AP, and a communication processor (CP). The processor 120 processes an operation or data on control of and/or communication with another component of the electronic device 101.

The processor 120, which may be connected to the LTE network, determines whether a call is connected over the CS service network using caller identification information (e.g., a caller phone number) of the CS service network (e.g., the 2G/3G network). For example, the processor 120 may receive incoming call information (e.g., a CS notification message or a paging request message) of the CS service network over the LTE network (e.g., CSFB). For example, the processor 120 being connected to the LTE network may receive incoming call information (e.g., a paging request message) over the CS service network (e.g., SRLTE).

When receiving the incoming call information (e.g., a CS notification message or a paging request message) of the CS service network over the LTE network, the processor 120 may obtain caller identification information from the incoming call information. The processor 120 displays the caller identification information on its display 160. The processor 120 may determine whether to connect the call based on input information corresponding to the caller identification information displayed on the display 160. For example, when detecting input information corresponding to an incoming call rejection, through the input/output interface 150, the processor 120 may restrict the voice call connection and maintains the LTE network connection. For example, when detecting input information corresponding to an incoming call acceptance, through the input/output interface 150, the processor 120 connects the voice call by connecting to the CS service network.

When receiving the incoming call information (e.g., a CS notification message or a paging request message) of the CS service network over the LTE network, the processor 120 may obtain caller identification information from the incoming call information. The processor 120 may determine whether to connect the call by comparing the caller identification information with a reception control list. For example, when the caller identification information is included in a first reception control list (e.g., a blacklist), the processor 120 may restrict the voice call connection and maintains the connection to the LTE network. For example, when the caller identification information is not included in the first reception control list (e.g., the blacklist), the processor 120 may connect the voice call by connecting to the CS service network. For example, when the caller identification information is included in a second reception control list (e.g., a white list), the processor 120 connects the voice call by connecting to the CS service network.

When receiving the incoming call information (e.g., a paging request message) of the CS service network over the LTE network, the processor 120 may transmit an incoming call response message (e.g., a paging response message) to the CS service network. The processor 120 may suspend the LTE service and receives the caller identification information (e.g., a CS call (CC) setup message) from the CS service network. The processor 120 may determine whether to connect the call by comparing the caller identification information with the reception control list. For example, when the caller identification information is included in the first reception control list (e.g., the blacklist), the processor 120 may restrict the voice call connection and resumes the LTE network connection. For example, when the caller identification information is not included in the first reception control list (e.g., the blacklist), the processor 120 may connect the voice call by connecting to the CS service network. For example, when the caller identification information is included in the second reception control list (e.g., the white list), the processor 120 connects the voice call by connecting to the CS service network.

The memory 130 can include volatile and/or nonvolatile memory. The memory 130 may store commands or data (e.g., the reception control list) relating to at least another component of the electronic device 100. The memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented by the other programs (e.g., the middleware 143, the API 145, or the applications 147). Furthermore, the kernel 141 provides an interface through which the middleware 143, the API 145, or the applications 147 may connect the individual elements of the electronic device 101 to control or manage the system resources.

The middleware 143 may function as an intermediary for allowing the API 145 or the applications 147 to communicate with the kernel 141 to exchange data. In addition, the middleware 143 may process one or more task requests received from the applications 147 according to priorities thereof. For example, the middleware 143 may assign priorities for using the system resources (e.g., the bus 110, the processor 120, the memory 130, and the like) of the electronic device 100, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function (e.g., an instruction) for file control, window control, image processing, text control, and the like.

The input/output interface 150 functions as an interface that transfers instructions or data input from a user or another external device to the other element(s) of the electronic device 101. Furthermore, the input/output interface 150 outputs the instructions or data received from the other element(s) of the electronic device 101 to the user or an external electronic device (e.g., a first external electronic device 102, a second external electronic device 104, or a server 106).

The display 160 may include a liquid crystal display (LCD), a light emitting diode (LED) display, an organic LED (OLED) display, a micro electro mechanical system (MEMS) display, an electronic paper display, and the like. The display 160 displays various types of content (e.g., a text, images, videos, icons, symbols, and the like) for the user. The display 160 may include a touch screen and receive, for example, a touch, a gesture, proximity, a hovering input, and the like, using an electronic pen or the user's body part. The display 160 may display a web page.

The communication interface 170 can establish a communication between the electronic device 100 and an external electronic device (e.g., a first external electronic device 102, a second external electronic device 104, or a server 106). For example, the communication interface 170 can communicate with the first external electronic device 102 through a wireless communication or a wired communication 164, and also communicate with the second external electronic device 104, or the server 106 in connection to a network 162 through wireless communication or wired communication. For example, the wireless communication can conform to a cellular communication protocol including at least one of LTE, LTE-advanced (LTE-A), CDMA, WCDMA, universal mobile telecommunications system (UMTS), wireless broadband (WiBro), and GSM.

The wired communication 164 can include at least one of universal serial bus (USB), high definition multimedia interface (HDMI), recommended standard 232 (RS-232), and plain old telephone service (POTS).

The network 162 can include at least one of telecommunications networks, for example, a computer network (e.g., a local area network (LAN) or a wide area network (WAN)), the Internet, a telephone network, and the like.

The electronic device 101 provides the LTE service in the single radio environment by use of at least one module functionally or physically separated from the processor 120. Various embodiments of the present disclosure will be described with reference to a display that includes a bent or curved area and is applied to a housing of an electronic device 101, in which a non-metal member and a metal member (e.g., a metal bezel) are formed through dual injection molding, but are not limited thereto. For example, the display 160 may be applied to a housing, in which a metal member or a non-metal member is formed of a single material.

Each of the first external electronic device 102 and the second external electronic device 104 may be a type of device that is the same as or different from the electronic device 101. According to an embodiment of the present disclosure, the server 106 may include a group of one or more servers. According to various embodiments of the present disclosure, all or some of the operations to be executed by the electronic device 101 may be executed by another electronic device or a plurality of other electronic devices (e.g., the first external electronic device 102, the second external electronic device 104 or the server 106). According to an embodiment of the present disclosure, in the case where the electronic device 101 should perform a certain function or service automatically or by request, the electronic device 101 may request some functions that are associated therewith from the other electronic devices (e.g., the first external electronic device 102 and the second external electronic device 104 or the server 106) instead of or in addition to executing the function or service by itself. The other electronic devices (e.g., the first external electronic device 102, the second external electronic device 104 or the server 106) may execute the requested functions or additional functions, and may transmit the results to the electronic device 101. The electronic device 101 may provide the requested functions or services by processing the received results as they are or additionally. For this purpose, for example, a cloud computing technique, a distributed computing technique, or a client-server computing technique may be used.

Various embodiments of the present disclosure will be described with reference to a display that includes a bent or curved area and is applied to a housing of an electronic device, in which a non-metal member and a metal member (e.g., a metal bezel) are formed through dual injection molding, but are not limited thereto. For example, the display may be applied to a housing, in which a metal member or a non-metal member is formed of a single material.

Figure 2A:
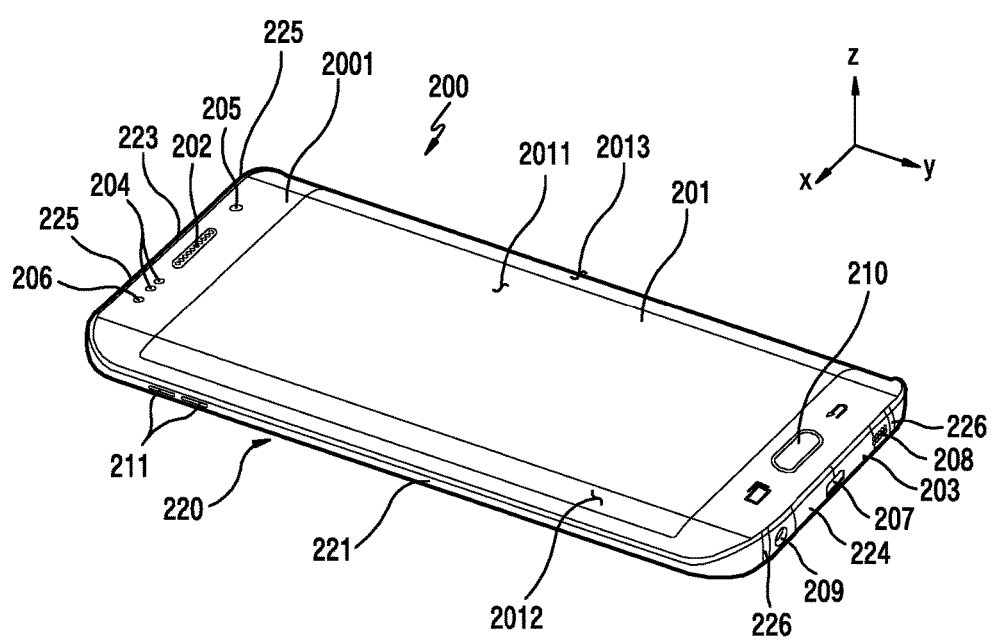
FIG. 2A is a front perspective view of an electronic device according to various embodiments of the present disclosure.
Figure 2B:
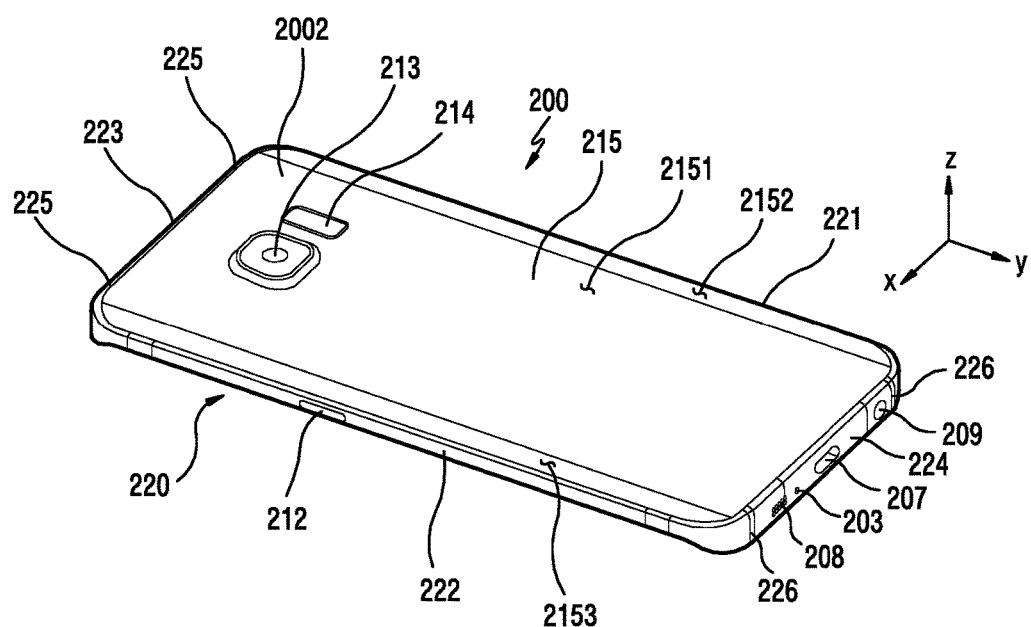
FIG. 2B is a rear perspective view of the electronic device according to various embodiments of the present disclosure.
Figure 2C:
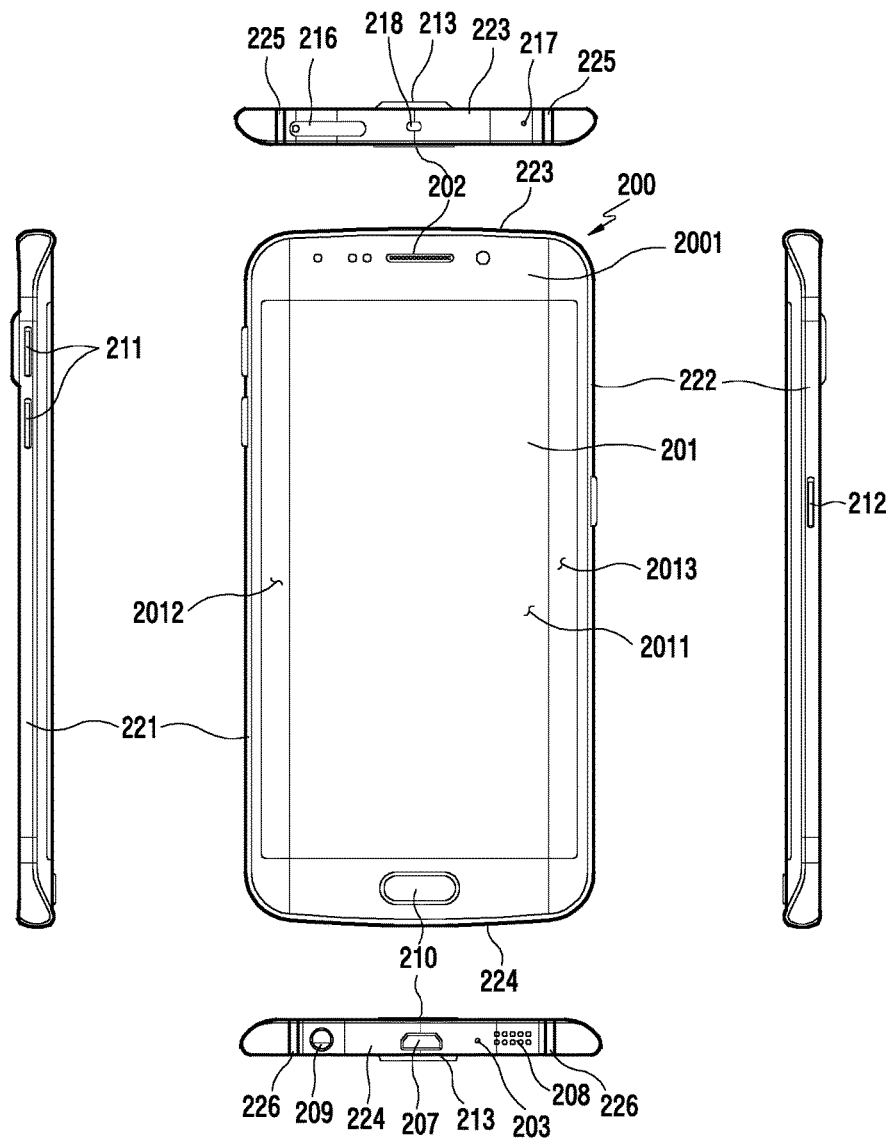
FIG. 2C illustrates side, front, bottom and top views of the electronic device according to various embodiments of the present disclosure.

FIG. 2A is a front perspective view of an electronic device according to various embodiments of the present disclosure. FIG. 2B is a rear perspective view of an electronic device according to various embodiments of the present disclosure. FIG. 2C illustrates side, front, bottom and top views of the electronic device according to various embodiments of the present disclosure.

Referring to FIGS. 2A to 2C, a display 201 may be installed on a front surface 2001 of an electronic device 200. A receiver 202 for receiving a voice of a counterpart may be disposed at the upper side of the display 201. A microphone device 203 for transmitting a voice of a user of the electronic device to the counterpart may be disposed at the lower side of the display 201.

According to an embodiment of the present disclosure, components for performing various functions of the electronic device 200 may be disposed around the receiver 202. The components may include at least one sensor module 204. The sensor module 204 may include at least one of, for example, an illuminance sensor (e.g., an optical sensor), a proximity sensor (e.g., an optical sensor), an infrared sensor, an ultrasonic sensor, and the like. According to an embodiment of the present disclosure, the components may include a front camera device 205. According to an embodiment of the present disclosure, the components may include an indicator 206 to inform the user of state information of the electronic device 200.

According to various embodiments of the present disclosure, the electronic device 200 may include a metal bezel 220 as a metal housing. According to an embodiment of the present disclosure, the metal bezel 220 may be disposed along the outer periphery of the electronic device 200 and may be disposed to extend to at least a part of the rear surface of the electronic device 200, which is continuous to the outer periphery. The metal bezel 220 defines at least a part of the thickness of the electronic device 200 along the outer periphery of the electronic device 200, and may be formed in a closed loop shape. Without being limited thereto, however, the metal bezel 220 may be formed in a manner that contributes to at least a part of the thickness of the electronic device 200.

According to an embodiment of the present disclosure, the metal bezel 220 may only be disposed in a part of the outer periphery of the electronic device 200. According to an embodiment of the present disclosure, when the metal bezel 220 may form a part of the housing of the electronic device 200 and the remaining portion of the housing may be formed by a non-metal material. In such a case, the housing may be formed in a manner of insert-molding the non-metal member to the metal bezel 220. The metal bezel 220 may include one or more cut-off portions 225 and 226 so that a unit bezel portion separated by the cut-off portions 225 and 226 may be utilized as an antenna radiator.

According to an embodiment of the present disclosure, an upper bezel portion 223 may be configured as a unit bezel portion by one pair of cut-off portions 225 that are formed at a certain interval. A lower bezel portion 224 may be configured as a unit bezel portion by one pair of cut-off portions 226 that are formed at a certain interval. The cut-off portions 225 and 226 may be formed in unison when the non-metal member is insert-molded to the metal member.

According to various embodiments of the present disclosure, the metal bezel 220 may have a closed loop shape along the outer periphery and may be disposed in a manner of contributing to the entire thickness of the electronic device 200. When the electronic device 200 is viewed from the front side thereof, the metal bezel 220 may include a left bezel portion 221, a right bezel portion 222, an upper bezel portion 223, and a lower bezel portion 224.

According to various embodiments of the present disclosure, on the lower bezel portion 224 of the electronic device, various electronic components may be disposed. According to an embodiment of the present disclosure, a speaker device 208 may be disposed at one side of the microphone device 203. At the a side of the microphone device 203, an interface connector port 207 may be disposed to perform a data transmission/reception function with respect to an external device and to charge the electronic device 200 by receiving an external power applied thereto. At a side of the interface connector port 207, an ear jack hole 209 may be disposed. All the microphone device 203, the speaker device 208, the interface connector port 207, and the ear jack hole 209 as described above may be disposed within the area of the unit bezel portion that is formed by one pair of cut-off portions 226 disposed in the lower bezel portion 224. Without being limited thereto, however, at least one of the above-described electronic components may be disposed in the area that includes the cut-off portion 226, or may be disposed outside the unit bezel portion.

According to various embodiments of the present disclosure, various electronic components may also be disposed on the upper bezel portion 223 of the electronic device 200. For example, on the upper bezel portion 223, a socket device 216 for insertion of a card-type external device may be disposed. The socket device 216 may accommodate at least one of an inherent identification (ID) card for the electronic device (e.g., a subscriber identity module (SIM) card or a user identity module (UIM)), and a memory card for extending a storage space. At a side of the socket device 216, an infrared sensor module 218 may be disposed. At a side of the infrared sensor module 218, an auxiliary microphone device 217 may be disposed.

According to an embodiment of the present disclosure, all the socket devices 216, the infrared sensor modules 218, and the auxiliary microphone devices 217 may be disposed within the area of the unit bezel portion formed by one pair of cut-off portions 225 that are disposed in the upper bezel portion 223. Without being limited thereto, however, at least one of the above-mentioned electronic components may be disposed in the area that includes of the cut-off portion 225, or may disposed outside the cut-off portion 225.

According to various embodiments of the present disclosure, one or more first side key buttons 211 may be disposed on the metal bezel 220 (e.g., on the left bezel portion 224). For example, one pair of first side key buttons 211 may be disposed on the left bezel portion 221 to partially protrude to contribute to the execution of a volume up/down function, a scroll function, and the like. One or more side key buttons 212 may be disposed on the metal bezel 220 (e.g., on the right bezel portion 222). The second side key button 212 may be configured to perform a power ON/OFF function, an electronic device wake-up/sleep function, and the like.

According to an embodiment of the present disclosure, at least one key button 210 may be disposed on a portion of the front surface 2001. For example, the key button 210 may perform a home key button function. A fingerprint recognition sensor device may be disposed on the top surface of the home key button. The home key button may be configured to perform a first function (a home screen return function, a wake-up/sleep function, and the like) by physically pressing the home key button, and to perform a second function (e.g., a fingerprint recognition function) by swiping the top surface of the home key button. Although not illustrated, touch pads may be disposed on the left and right of the key button 210 so as to perform a touch function.

According to various embodiments of the present disclosure, the front surface 2001, in which the display 201 is provided, may include a planar portion 2011, and a left bent portion 2012 and a right bent portion 2013 which are formed on the left and right of the planar portion 2011, respectively. According to an embodiment of the present disclosure, the front surface 2001 of the electronic device 200 may include a display area 2011 and the other areas (e.g., a black matrix (BM) area) by using a single window. The left and right bent portions 2012 and 2013 may be formed to extend in an x-axis direction of the electronic device 200 of FIG. 2A from the planar portion 2011. According to an embodiment of the present disclosure, each of the left and right bent portions 2012 and 2013 may be configured as a part of the side surfaces of the electronic device 200. In such a case, the left and right bent portions 2012 and 2013 may be configured as the side surfaces of the electronic device 200 together with the left and right bezel portions 221 and 222 of the metal bezel 220, respectively. Without being limited thereto, however, the front surface 2001, in which the display 201 is provided, may include at least one of the left and right bent portions 2012 and 2013. The front surface 2001 may be configured to include only the left bent portion 2012 along the planar portion 2011, or to include only the right bent portion 2013 along the planar portion 2011.

According to various embodiments of the present disclosure, the front surface 2001 may include a flexible display module that is applied to at least a portion of the window that includes the bent portions 2012 and 2013 on the left and right thereof, and the lower side of the window. The area including the flexible display module may be configured as a display area 2011. According to an embodiment of the present disclosure, the window may be formed in a manner in which the top and rear surfaces thereof are simultaneously bent (hereinafter, a "three-dimensional (3D) type"). Without being limited thereto, the window may be formed in a manner in which the left and right portions of the top surface are formed in a curved shape and the rear surface is formed in a planar shape (hereinafter, "two-and-a-half dimensional (2.5D) type"). According to an embodiment of the present disclosure, the window may be formed of a transparent glass material (e.g., a sapphire glass) or a transparent synthetic resin material.

According to various embodiments of the present disclosure, the electronic device 200 may control the display module so as to selectively display information. According to an embodiment of the present disclosure, the electronic device 200 may control the display module so as to configure a screen only on the planar portion 2011. For example, the electronic device 200 may control the display module to configure a screen by any one of the left and right bent portions 2012 and 2013 together with the planar portion 2011. The electronic device 200 may control the display module to configure a screen by at least one of the left and right bent portions 2012 and 2013, excluding the planar portion 2011.

Referring to FIG. 2B, a rear camera device 213 may be disposed on the rear surface 2002 of the electronic device 200, and one or more electronic components 214 may be disposed at a side of the rear camera device 213. According to an embodiment of the present disclosure, the electronic components 214 may include at least one of an illuminance sensor (e.g., an optical sensor), a proximity sensor (e.g., an optical sensor), an infrared sensor, an ultrasonic sensor, a heartrate sensor, a flash device, and the like.

According to various embodiments of the present disclosure, the rear surface 2002 of the electronic device 200 may also be entirely formed by one window 215. The rear surface 2002 may include a planar portion 2151 that is substantially formed in the central portion to be the center, and a left bent portion 2152 and a right bent portion 2153, which are formed on the left and right of the planar portion 2151, respectively.

According to an embodiment of the present disclosure, the window 215 may be configured in the 2.5D type in which the left and right bent portions 2152 and 2153 of the outer surface are formed in a curved shape and the rear surface is formed as a planar surface. Without being limited thereto, however, the window 215 may be formed in the 3D type similar to the window disposed on the front surface 2001.

According to an embodiment of the present disclosure, each of the left and right bent portions 2152 and 2153 may be configured as a part of the side surfaces of the electronic device 200. In such a case, the left and right bent portion 2152 and 2153 may be configured as the side surfaces of the electronic device 200 together with the left and right bezel portions 221, 222 of the metal bezel 220. Without being limited thereto, however, the rear surface 2002 may include only at least one of the left and right bent portions 2152 and 2153. For example, the rear surface 2002 may be configured to include only the left bent portion 2152 along the planar portion 2151, or to include only the right bent portion 2153 along the planar portion 2151.

According to various embodiments of the present disclosure, the upper side left and right corner portions and the lower side left and right corner portions of the front surface 2001 may be formed to be simultaneously inclined in the x-axis direction, the y-axis direction, and the z-axis direction in FIG. 2A while the window is bent. With this shape, the upper side left and right corner portions and the lower side left and right corner portions of the metal bezel 220 may be formed such that the heights thereof gradually decrease towards the side surfaces, respectively.

While a metal bezel 220, which is configured as a part of the housing of the electronic device 200, has been illustrated and described above, various embodiments of the present disclosure are not limited thereto. For example, various metal members disposed on the electronic device 200 may be used for various embodiments of the present disclosure.

Figure 3:
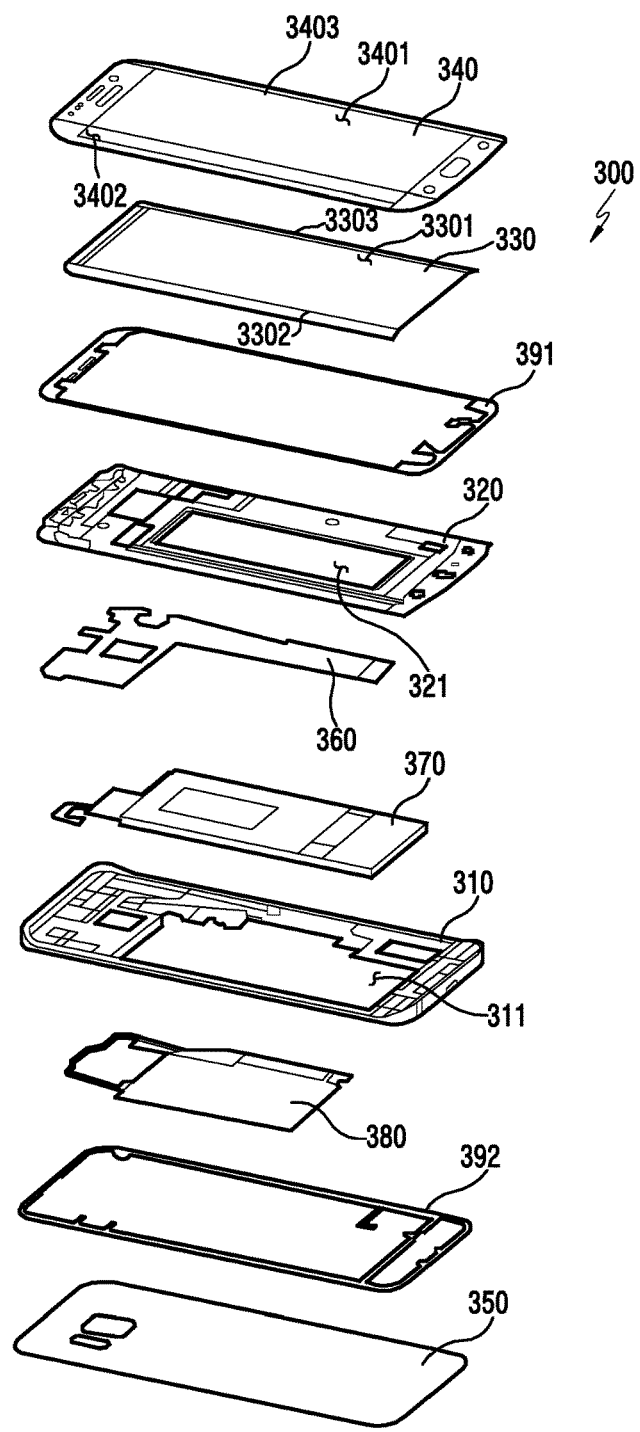
FIG. 3 is an exploded perspective view of an electronic device according to various embodiments of the present disclosure.

FIG. 3 is an exploded perspective view of an electronic device according to various embodiments of the present disclosure. Hereinafter, the electronic device illustrated in FIG. 3 may be an electronic device which is the same as the above-described electronic device 200.

Referring to FIG. 3, an electronic device 300 may include a printed circuit board (PCB) 360, a bracket 320, a display module 330, and a front window 340, which may be disposed in a manner of being sequentially stacked on the upper side of the housing 310. According to an embodiment of the present disclosure, the electronic device may include a wireless power transmission/reception member 380 and a rear window 350, which may be disposed in a manner of being sequentially stacked on the lower side of the housing 310.

According to an embodiment of the present disclosure, the battery pack 370 is accommodated in an accommodation space 311 of the battery pack 370, which is formed in the housing 310, and may be disposed to avoid the PCB 360. The battery pack 370 and the PCB 360 may be disposed in parallel and not to overlap with each other. The display module 330 may be fixed to the bracket 320, and the front window 340 may be fixed by being attached to the bracket 320 by a first adhesive member 391. The rear window 350 may be fixed by being attached to the housing 310 by a second adhesive member 392.

According to various embodiments of the present disclosure, the front window 340 may include a planar portion 3401, and a left bent portion 3402 and a right bent portion 3403, which are bent in opposite directions from the planar portion 3401. The front window 340 may be positioned on the electronic device 300 so as to form the front surface, and is formed of a transparent material so as to display a screen presented by the display module 330 and to provide an input/output window for various sensors. While the shape the left and right bent portions 3402 and 3403 are illustrated as formed in the 3D type, a shape in which the upper and lower portions as well as the left and right portions are single-bent, or a shape in which the upper, lower, left, and right portions are dual-bent, may be applied. A touch panel may be further disposed on the rear surface of the front window 340 and may receive a touch input signal from the outside.

According to various embodiments of the present disclosure, the display module 330 may also be formed in a shape corresponding to that of the front window 340 (a shape having a curvature corresponding to that of the front window 340). According to an embodiment of the present disclosure, the display module 330 may include a planar portion 3301, and left and right bent portions 3302 and 3303 on the left and right of the planar portion 3301. A flexible display module may be used as the display module 330. In the case of a window of a type where the rear surface of the front window 340 is formed in a planar shape (hereinafter, 2D type or 2.5 D type), and the rear surface of the front window 340 is planar, an ordinary LCD or an on-cell touch screen panel (TSP) active matrix OLED (AMOLED) (OCTA) may be applied.

According to various embodiments of the present disclosure, the first adhesive member 391 is a component for fixing the front window 340 to a bracket 320 that is disposed within the electronic device 300, and may be a kind of tape, such as a double-sided tape, or a liquid adhesive layer, such as a bond. According to an embodiment of the present disclosure, when the double-sided tape is applied as the first adhesive member 391, a general polyethylene terephthalate (PET) or a functional base may be applied as the internal base of the adhesive member 391. For example, by using a base formed of a foam type or shock-resistive fabric material so as to reinforce the shock resistance, it is possible to prevent the front window 340 from being destroyed by external impact.

According to various embodiments of the present disclosure, the bracket 320 may be used as a component for reinforcing the entire rigidity of the electronic device 300 by being disposed within the electronic device 300. According to an embodiment of the present disclosure, the bracket 320 may be formed of at least one metal selected from aluminum (Al), magnesium (Mg), and sterling silver (STS). For example, the bracket 320 may be formed of a highly rigid plastic, in which glass fibers are contained, or may be formed of a combination of a metal and a plastic. When a metal member and a non-metal member are used in combination, the bracket 320 may be formed by insert-molding the non-metal member to the metal member. The bracket 320 may be placed on the rear surface of the display module 330. The bracket 320 may have a shape (curvature) that is similar to the shape of the rear surface of the display module 330 and may support the display module 330.

According to an embodiment of the present disclosure, between the bracket 320 and the display module 330, an elastic member, such as a sponge or a rubber, and an adhesive layer, such as a double-sided tape or a single, sheet layer (e.g., such as a single-sided tape), may be additionally disposed so as to protect the display module 330. A section of the bracket 320 may further include a slot-sinking or hole area 321 for securing a component mounting space or include added (e.g., a swelling gap) to accommodate a change of a component during use, such as the swelling of the battery pack 370. According to an embodiment of the present disclosure, a sheet-type metal or composite material may be added to the corresponding hole area 321 so as to reinforce the internal rigidity, or as an auxiliary device for improving a thermal characteristic, an antenna characteristic, and the like. According to an embodiment of the present disclosure, the bracket 320 may be fastened to the housing 310 (e.g., the rear case) so as to form a space therein, and at least one electronic component may be disposed in such a space.

According to various embodiments of the present disclosure, the at least one electronic component may include a PCB 360. Without being limited thereto, however, the at least one electronic component may include an antenna device, a sound device, a power supply device, a sensor device, and the like in addition to the PCB 360.

According to various embodiments of the present disclosure, the battery pack 370 may supply power to the electronic device 300. According to an embodiment of the present disclosure, one surface of the battery pack 370 may be close to the display module 330 and the other surface may be close to the rear window 350 if the battery pack 370 swells during charge, counterpart objects may be deformed or destroyed. In order to prevent this, a space (e.g., swelling gap) may be provided between the battery pack 370 and the counterpart objects (e.g., the display module 330 and the rear window 350) so as to protect the counterpart objects from deformation or destruction. According to an embodiment of the present disclosure, the battery pack 370 may be integrated with the electronic device 300. Without being limited thereto, however, when the rear window 350 is implemented to be attachable to/detachable from the electronic device 300, the battery pack 370 may be implemented to be attachable/detachable.

According to various embodiments of the present disclosure, the housing 310 forms the exterior of the electronic device 300 (e.g., side surfaces including a metal bezel (e.g., metal bezel 220)), and may be coupled to the bracket 320 so as to form an internal space. According to an embodiment of the present disclosure, a front window 340 may be disposed on the front surface of the housing 310, and a rear window 350 may be disposed on the rear surface of the housing 310. Without being limited thereto, however, the rear surface of the housing 310 may be variously implemented by molding a synthetic resin, or by using a metal, a composite of a metal and a synthetic resin, and the like. For example, an inter-structure gap formed by the housing 310 and the rear window 350 may prevent the destruction of the rear window 350 from the secondary impact by an internal structure when an external impact occurs, such as the drop of the electronic device 300 to the ground.

According to various embodiments of the present disclosure, a wireless power transmission/reception member 380 may be disposed on the rear surface of the housing 310. According to an embodiment of the present disclosure, the wireless power transmission/reception member 380 mainly has a thin film form and is disposed by being attached to one surface of an internally mounted component or an area of the inner surface of the housing 310, in particular to an area that is generally close to the rear window 350. The wireless power transmission/reception member 380 may include a structure that forms a contact with the PCB 360 within the housing 310. According to an embodiment of the present disclosure, the wireless power transmission/reception member 380 may be embedded or attached as a component of the battery pack 370, and the like, or a part of the housing 310, and may be provided in the form of being attached to more than one structure (e.g., attached to both of a component and the housing 310).

According to various embodiments of the present disclosure, the second adhesive member 392 is a component that fixes the rear window 350 to the housing 310 and may be applied in a form similar to that of the first adhesive member 391 described above.

According to various embodiments of the present disclosure, the rear window 350 may be applied in a form similar to that of the front window 340. According to an embodiment of the present disclosure, the front surface (the surface exposed to the outside) of the rear window 350 may be formed in a curvature that is more inclined as going to both of the left and right ends. The rear surface of the rear window 350 may be formed in a planar surface to be attached to the housing 310 by the second adhesive member 392.

Figure 4A:
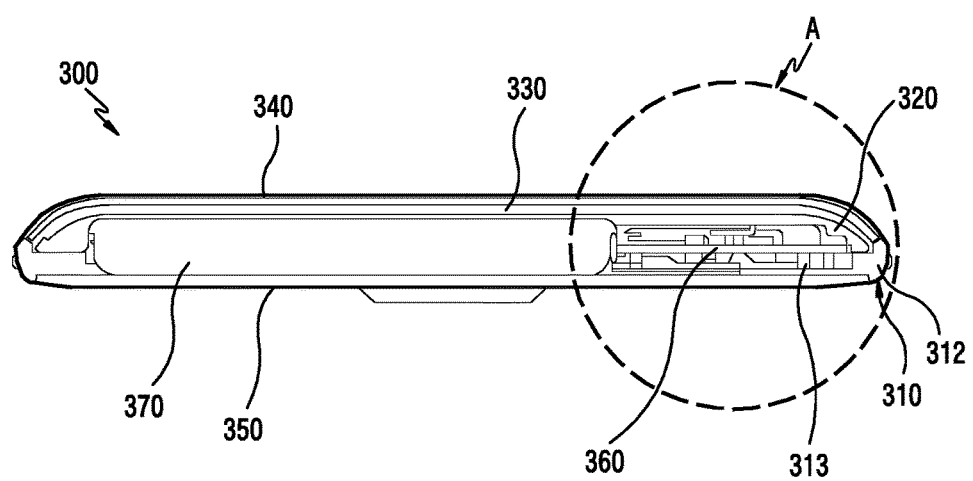
FIG. 4A is a cross-sectional, side view illustrating the electronic device according to various embodiments of the present disclosure in an assembled state.
Figure 4B:
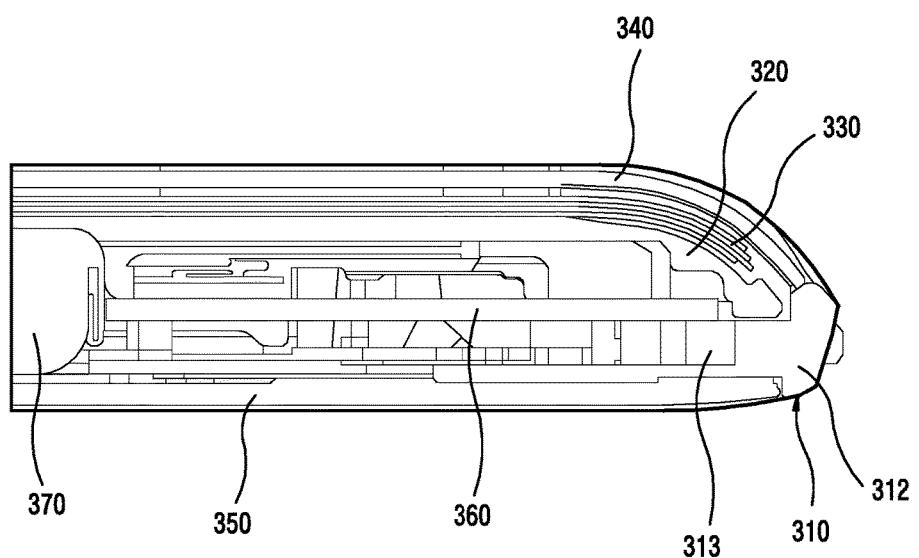
FIG. 4B is a cross-sectional view illustrating a section A of electronic device designated in FIG. 4A.

FIG. 4A is a cross-sectional, side view illustrating an electronic device in the assembled state according to various embodiments of the present disclosure. FIG. 4B is a cross-sectional view illustrating a section A of electronic device designated in FIG. 4A according to various embodiments of the present disclosure.

Referring to FIGS. 4A and 4B, the electronic device 200 may include a bracket 320 that may be fixed to the housing 310. According to an embodiment of the present disclosure, the housing 310 may be formed by injection-molding a non-metal member (e.g., polycarbonate) 313 to the metal bezel 312. According to an embodiment of the present disclosure, the display module 330 may be fixed to the front surface of the bracket 320, and the front window 340 may be disposed on the display module 330. The front window 340 may be fixed by being attached to the bracket 320 by the first adhesive member 391 adjacent to an end of the housing 310.

According to an embodiment of the present disclosure, the front window 340 may be fixed by being attached to the bracket 320 by the first adhesive member 391 to correspond to the shape thereof on the end of the housing 310. According to an embodiment of the present disclosure, the front window 340 may be fixed by being attached to the bracket 320 by the first adhesive member 391 while being supported by the end of the housing 310. According to an embodiment of the present disclosure, the front window 340 may have a uniform thickness and may be formed in a shape having a certain curvature. According to an embodiment of the present disclosure, all of the planar portion and the left and right bent portions of the front window 340 may be formed to have a uniform or varying thickness.

According to various embodiments of the present disclosure, the rear window 350 may also be fixed to the housing 310 by the second adhesive member 392. According to an embodiment of the present disclosure, the rear window 350 may be formed to have a thickness that is reduced towards the left and right edges (a shape which is formed in the 2.5D type).

According to various embodiments of the present disclosure, in the space between the bracket 320 and the housing 310, an electronic component, such as the PCB 360, may be accommodated, and the battery pack 370 may be disposed in parallel with the PCB 360 to avoid the PCB 360.

Figure 5A:
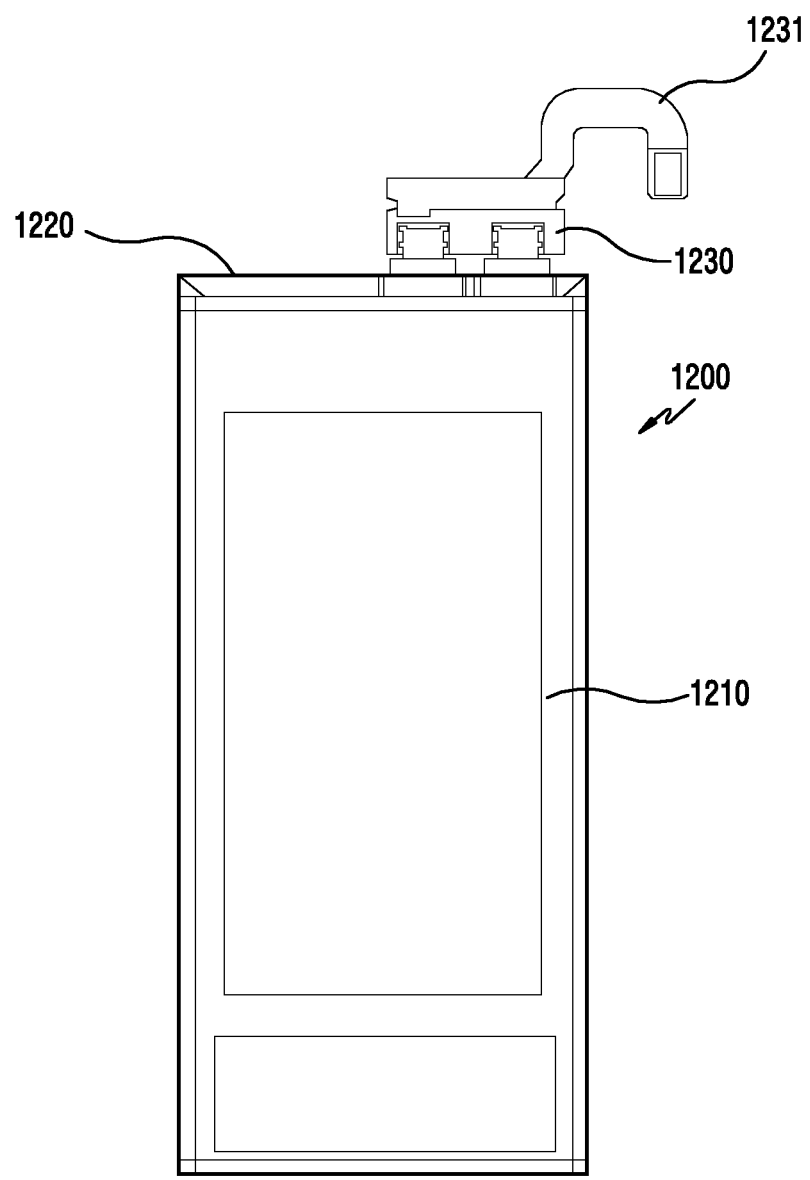
FIG. 5A is a view illustrating a configuration of a battery pack according to various embodiments of the present disclosure.

FIG. 5A is a view illustrating a configuration of a battery pack according to various embodiments of the present disclosure.

Referring to FIG. 5A, a battery pack 1200 includes a battery cell 1210, a power control module (PCM) unit 1230 disposed on a side area of the upper side of the battery cell 1210, and a connection terminal portion 1231 that is drawn out from the PCM unit 1230 and electrically connected to a PCB (e.g., PCB 360) of an electronic device. According to an embodiment of the present disclosure, the PCM unit 1230 may be installed on a pouch terrace 1220 that is disposed on the upper portion of the battery cell 1210. According to an embodiment of the present disclosure, the battery pack 1200 may be configured as a battery pack that is embedded (e.g., integrally) in an embodiment of the electronic device.

According to various embodiments of the present disclosure, the PCM unit 1230 may perform functions of detecting (when the voltage of the battery pack 1200 increases due to a charge voltage and a charge current that are input from the outside) a battery voltage, and cutting off and releasing the charge current such that the battery is not charged to a level that is equal to or higher than an over-charge voltage set. The PCM unit 1230 may perform a function of detecting (when the voltage of the battery is gradually discharged due to the current consumed to the outside) the battery voltage, and cutting off and releasing the discharge current such that the battery is not discharged to a level that is equal to or lower than an over-discharge voltage set in the module. The PCM unit 1230 may perform a function of cutting off and releasing a charge or discharge current such that the current is charged or discharged to a level that is equal to or higher than an over-current set due to an abnormal phenomenon of an electronic device or a charge device.

According to an embodiment of the present disclosure, when plus (+) and minus (−) terminals are short-circuited in the outside of the battery pack 1200, a current of about 20 times the capacity of the battery pack 1200 flows instantly. The PCM unit 1230 may perform functions of preventing an accident and protecting the battery pack 1200 by cutting off the current.

While a battery pack 1200 is disposed in parallel with a PCB (e.g., PCB 360) in an electronic device (for example, disposed in parallel with the exterior of the battery pack), a restriction may be 1200 by the PCM unit 1230 that is uniformly disposed on the upper portion of the battery pack 1200. For example, due to the shape of the rectangular battery pack 1200, the battery pack 1200 may occupy a large space in the entire length direction of the PCM unit 1230. Accordingly, it is necessary to make the arrangement of the PCM unit 1230 of the battery pack 1200 variable so as to maximize a space efficiency according to the mounting of the battery pack 1200, thereby contributing to the slimming of the electronic device.

Figure 5B:
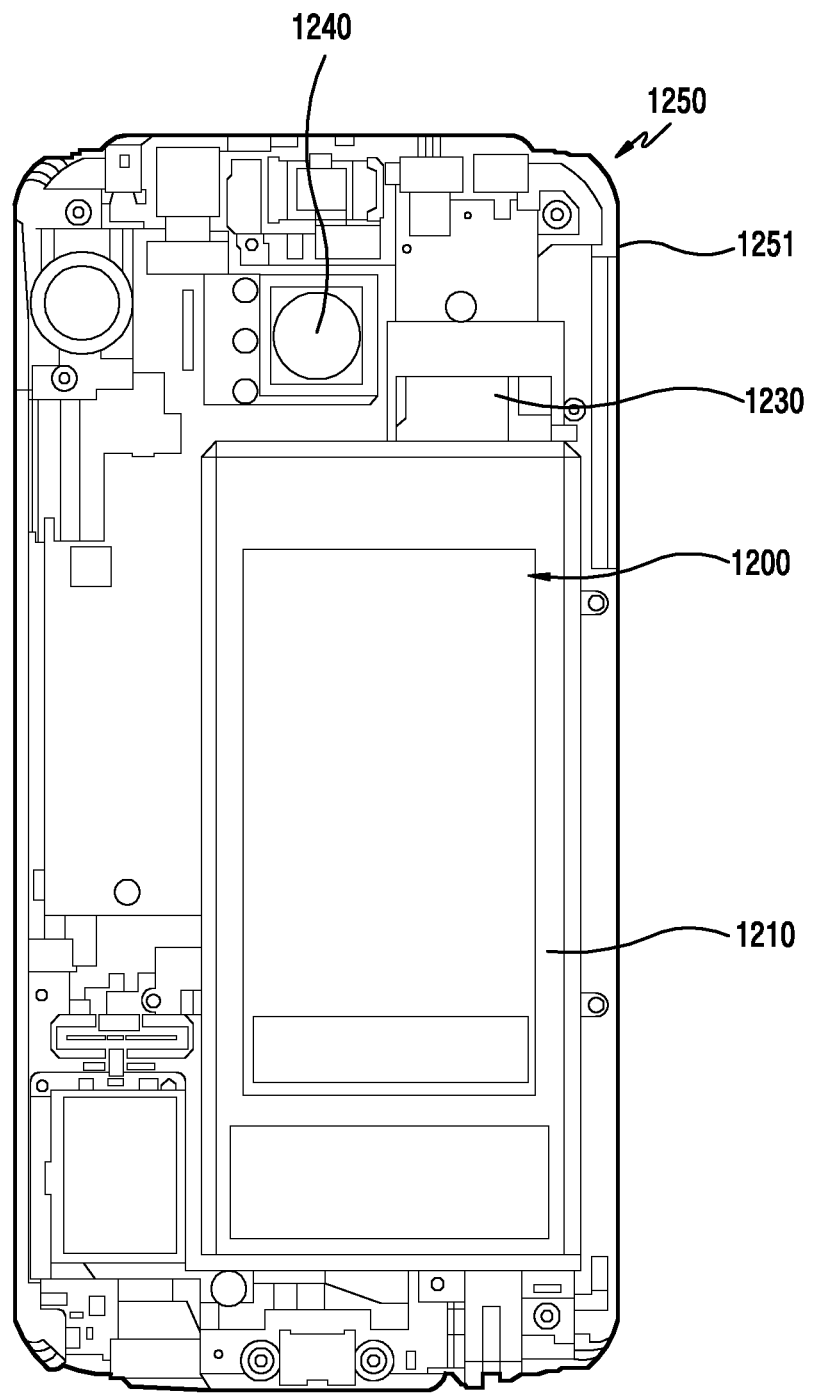
FIG. 5B is a view illustrating a configuration in a state where the battery pack is applied to a housing of an electronic device according to various embodiments of the present disclosure.
Figure 5C:
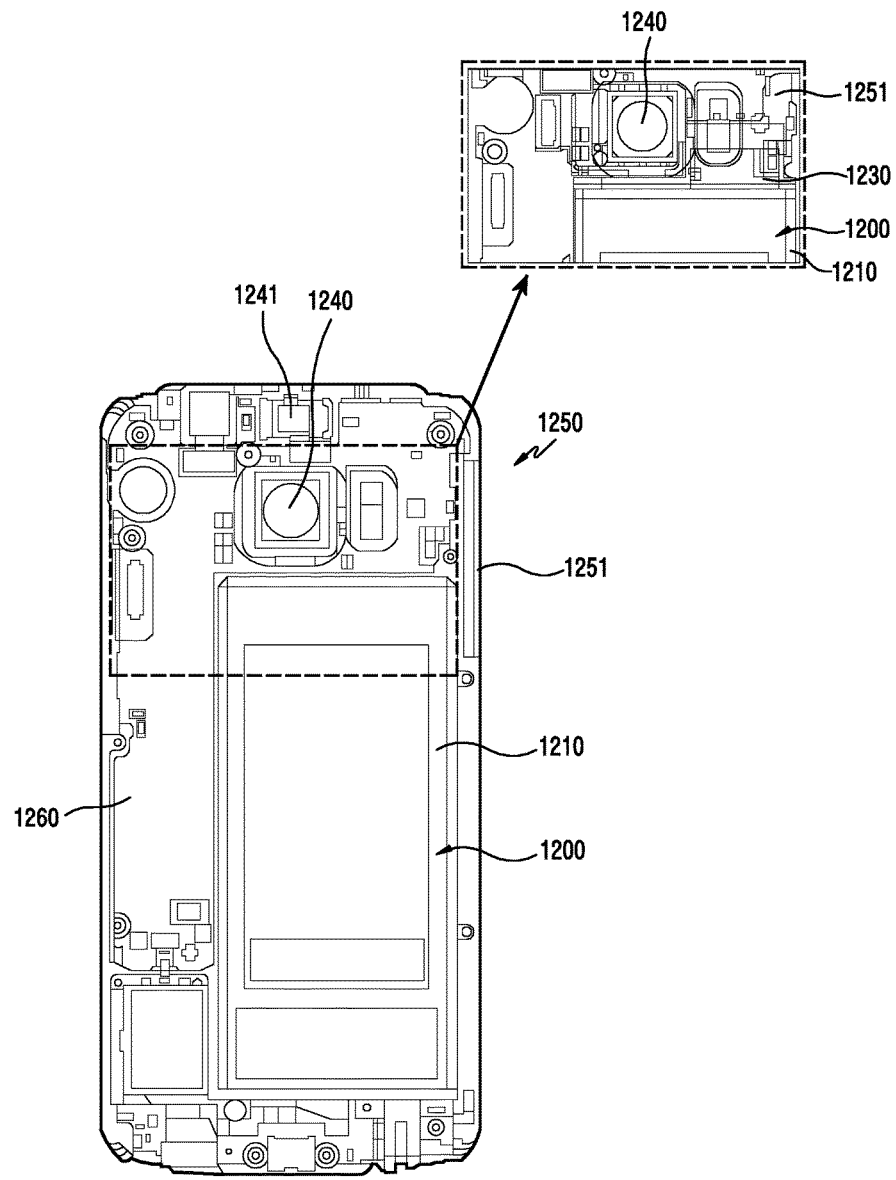
FIG. 5C is a view illustrating a configuration in a state where the battery pack is applied to a housing and a PCB of an electronic device according to various embodiments of the present disclosure.

FIG. 5B is a configuration view illustrating a state in which battery pack is applied to a housing of an electronic device according to various embodiments of the present disclosure. FIG. 5C is a configuration view illustrating a state in which a battery pack is applied to a housing and a PCB of an electronic device according to various embodiments of the present disclosure.

Referring to FIGS. 5B and 5C, the battery pack 1200 may be mounted in the housing 1251 of the electronic device 1250. According to an embodiment of the present disclosure, the PCM unit 1230 of the battery pack 1200 may be formed to be biased to one side in the entire length direction, and an electronic component 1240 may be disposed in the area where the PCM unit 1230 is not disposed. For example, the PCM unit 1230 may be disposed at a position where it is overlapped or partially overlapped with the PCB 1260 of the electronic device 1250. The PCM unit 1230 may be disposed at a position where it is overlapped (or at least partially overlapped) with the PCB 1260 and to avoid the electronic component 1240 that is mounted on and protrude from the PCB 1260. For example, the PCM unit 1230 may protrude from at least a portion of the battery pack 1200 such that at least the portion is arranged to partially overlap with the PCB in a first face of the PCB 1260. At least one electronic component that is mounted on a second face of the PCB 1260 which is opposite to the first face of the PCB 1260 to at least partially overlap with the PCM unit 1230. The electronic component 1240 may include a component that is mounted on and protrudes from the PCB 1260, such as a memory, a processor, various elements, a camera device, various sensor modules (e.g., a heart rate monitor (HRM) sensor module), a flash, and the like.

Figure 6:
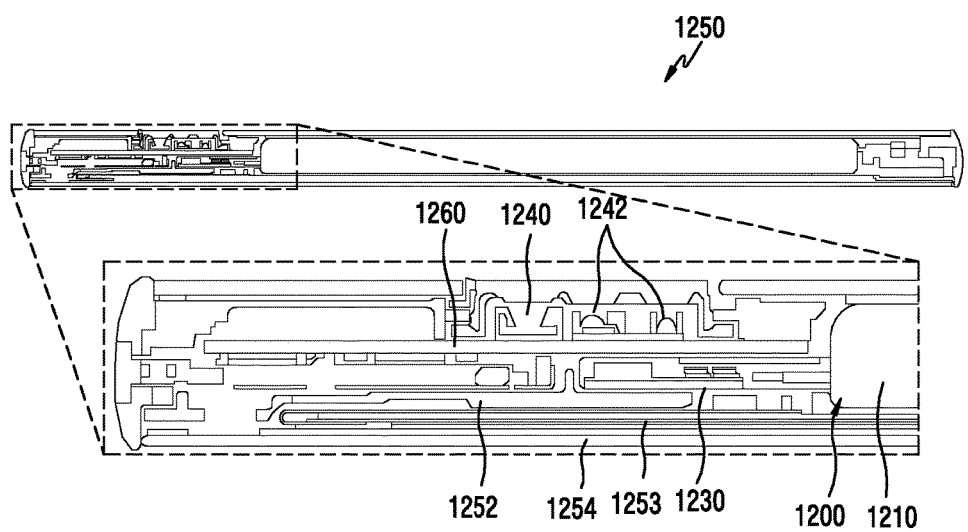
FIG. 6 is a cross-sectional view illustrating a part of an electronic device in a state where a battery pack overlaps with a PCB according to various embodiments of the present disclosure.

FIG. 6 is a cross-sectional view illustrating a portion of an electronic device in a state where a battery pack and a PCB are overlapped with each other according to various embodiments of the present disclosure.

Referring to FIG. 6, the electronic device 1250 may include the battery pack 1200 mounted therein. According to an embodiment of the present disclosure, the battery cell 1210 of the battery pack 1200 may be mounted in parallel with the PCB 1260 of the electronic device 1250 to avoid the PCB 1260. The battery pack 1200 may be configured such that the PCM unit 1230 is drawn out by a certain length, and may be disposed such that at least a part of the PCM unit 1230 is overlapped with the PCB 1260.

According to various embodiments of the present disclosure, the PCM unit 1230 may be disposed below or on the bottom of the PCB 1260, and various electronic components 1240 and 1242 may be disposed above or on the top of the PCB 1260. The electronic component may be at least one of a memory, a processor, various elements, a camera device, various sensor modules, and a flash device. By disposing the PCM unit 1230 to overlap with the PCB 1260 within the area of the PCB 1260 adjacent to the battery pack 1200 and within the thickness of the battery pack 1200, the window 1254 that includes the display 1253 and the bracket 1252, that supports the display 1253, may be at least partially accommodated.

Figure 7A:
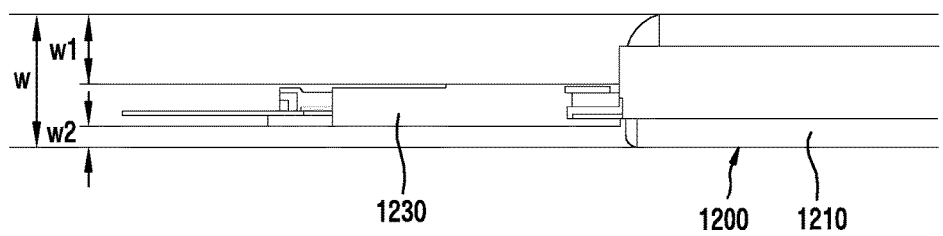
FIG. 7A is a cross-sectional view illustrating a part of an electronic device in which mounting electronic components in relation to the thickness of a battery pack according to various embodiments of the present disclosure.
Figure 7B:
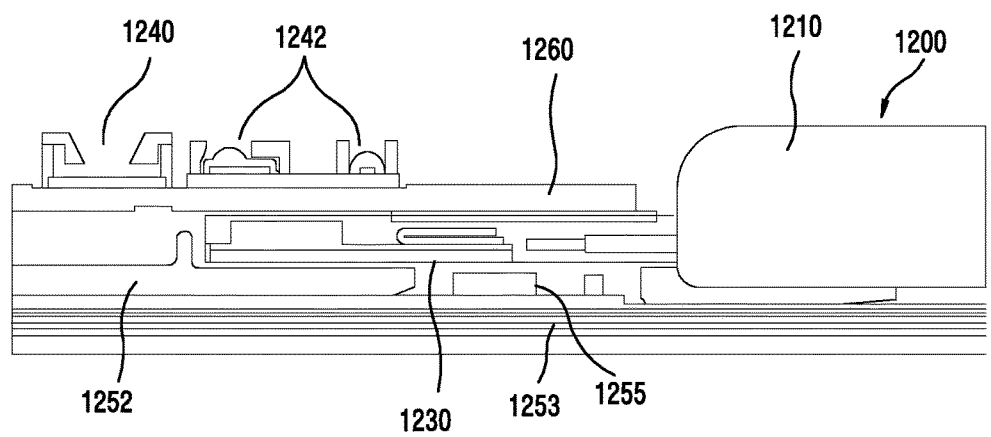
FIG. 7B is a cross-sectional view illustrating a part of an electronic device in which mounting electronic components in relation to the thickness of a battery pack according to various embodiments of the present disclosure.

FIGS. 7A and 7B are cross-sectional views illustrating a portion of an electronic device, in which methods of mounting electronic components in relation to a thickness of a battery pack are illustrated according to various embodiments of the present disclosure.

Referring to FIGS. 7A and 7B, in the entire thickness 'w' of the battery pack 1200, the remaining thicknesses w1 and w2, except the thickness of the PCM unit 1230, may be used as mounting spaces for various electronic components 1240, 1242, and 1255, including the PCB 1260 of the electronic device (see, e.g., FIG. 6).

According to various embodiments of the present disclosure, in the upper area of the PCM unit 1230, the PCB 1260 and electronic components 1240 and 1243, such as a memory, a processor, various elements, a camera device, various sensor module, and a flash device, which are mounted above or on the top of the PCB 1260, may be disposed. In the entire thickness 'w' of the battery pack 1200, the upper thickness w1, except the thickness of the PCM unit 1230, may provide at least a part of a space, in which the PCB 1260 and electronic components 1240 and 1242, such as a memory, a processor, various elements, a camera device, various sensor module, and a flash device, which are mounted on the top of the PCB 1260, may be applied. According to an embodiment of the present disclosure, in the thickness 'w' of the battery pack 1200, the lower thickness w2, except the thickness of the PCM unit 1230, may provide at least a part of a space, in which an electronic component for the display 1253 and the bracket 1252 for supporting the display 1253, are applied.

Figure 8A:
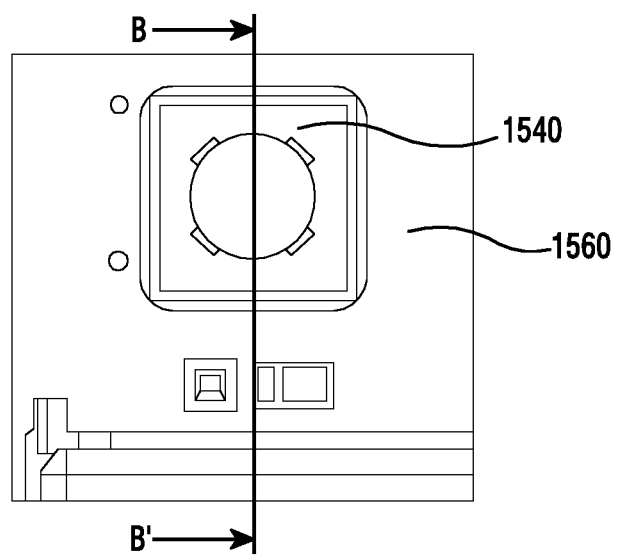
FIG. 8A is a top view illustrating a configuration between a PCM unit of a battery pack and an electronic component according to various embodiments of the present disclosure.
Figure 8B:
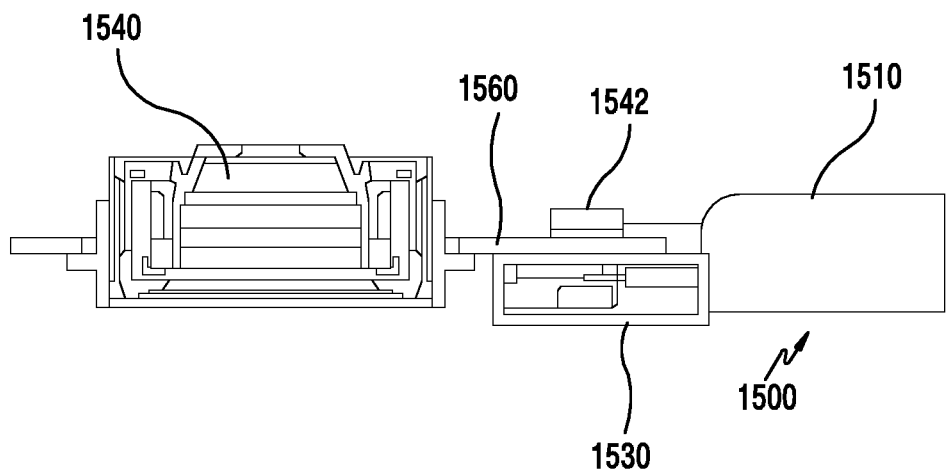
FIG. 8B is a cross-sectional view along section B-B' of the arrangement in FIG. 8A illustrating a configuration between a PCM unit of a battery pack and an electronic component according to various embodiments of the present disclosure.

FIG. 8 is a view illustrating a disposed relationship between a PCM unit of a battery pack and electronic components according to various embodiments of the present disclosure. Specifically, FIG. 8A is a top view illustrating a configuration between a PCM unit of a battery pack and an electronic component according to various embodiments of the present disclosure. FIG. 8B is a cross-sectional view along section B-B' of the arrangement in FIG. 8A illustrating a configuration between a PCM unit of a battery pack and an electronic component according to various embodiments of the present disclosure.

Referring to FIGS. 8A and 8B, when a sensor module and a flash device 1542 are arranged below a camera module 1540 as the electronic components, the battery cell 1510 of the battery pack 1500 may be disposed in parallel with the PCB 1560 and the camera module 1540 mounted above or on the PCB 1560. According to an embodiment of the present disclosure, the PCM unit 1530 of the battery pack 1500 may be disposed to overlap with the sensor module and the flash device 1542 which are mounted on the PCB 1560. The sensor module and the flash device 1542 may be mounted above or on the top of the PCB 1560, and the PCM unit 1530 of the battery pack 1500 may be disposed below or on the bottom of the PCB 1560 to overlap with the sensor module and the flash device 1542. Accordingly, as compared to an existing mounting structure in which the battery pack 1500 is disposed in parallel with the PCB 1560, it is possible to secure a component mounting space or to increase the size/capacity of the battery cell 1510.

Figure 9:
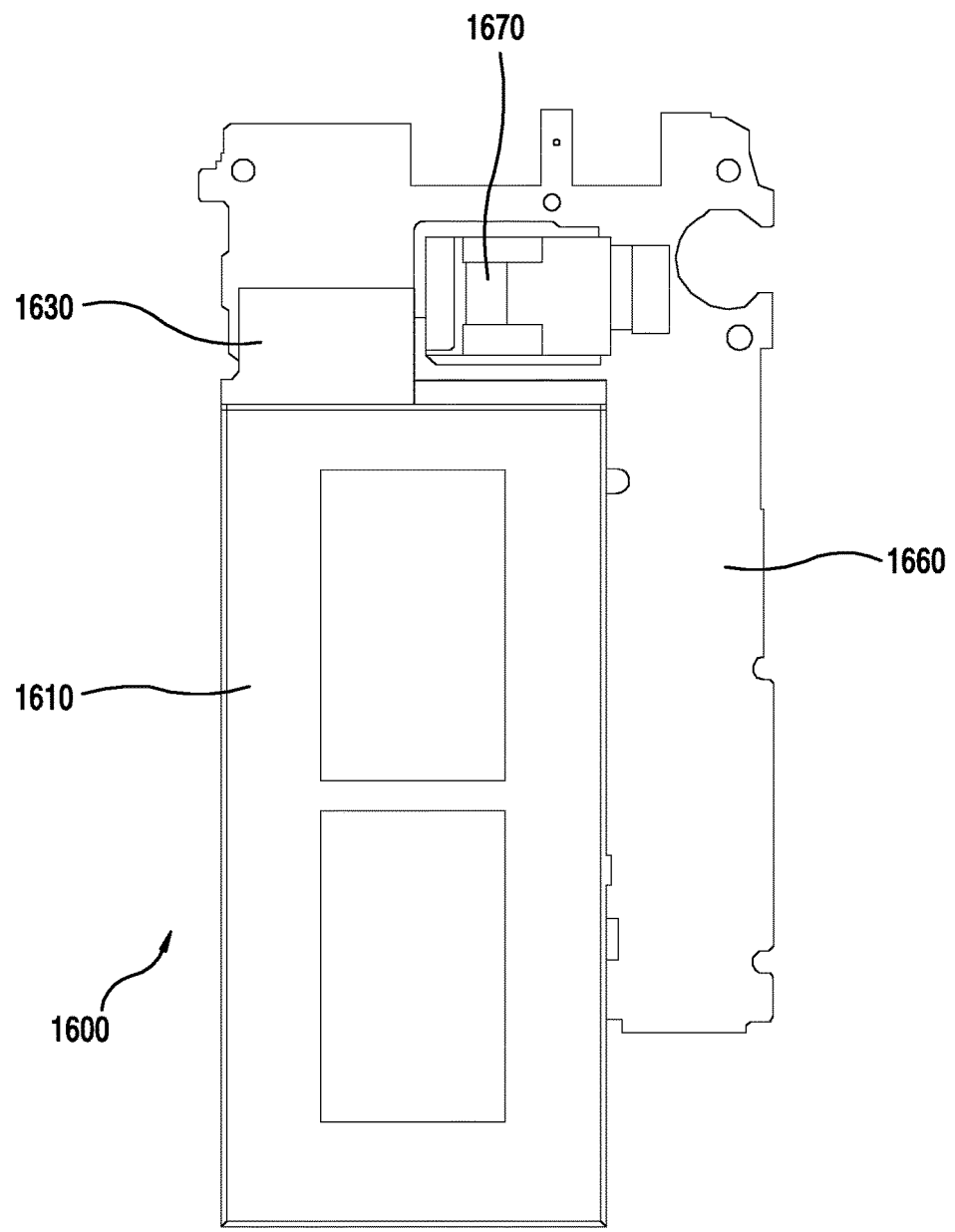
FIG. 9 is a view illustrating a configuration between a PCM unit of a battery pack and an electronic component according to various embodiments of the present disclosure.

FIG. 9 is a configuration view illustrating a disposed relationship between a PCM unit of a battery pack and an electronic component according to various embodiments of the present disclosure.

Referring to FIG. 9, a battery cell 1610 of a battery pack 1600 may be mounted to avoid a PCB 1660. For example, the battery cell 1610 may be disposed at least on the same plane as the PCB 1660. However, a PCM unit 1630, which is disposed to be weighted to the upper side of the battery cell 1610, may be disposed to be at least partially overlapped with and to be electrically connected to the PCB 1660. PCM unit 1630 may be arranged on a face that is equal to a face of the PCB on which the electronic component is mounted. The PCM unit 1630 is mounted on a face that is opposite to a face of the PCB 1660 on which the electronic component is mounted. In addition, on the PCB 1660, an electronic component such as a socket device 1670 may be mounted in or around an area in which the PCM unit 1630 of the battery pack 1600 is disposed. According to an embodiment of the present disclosure, the socket device 1670 may accommodate a card-type external device (e.g., a SIM card, a UIM card, a card-type memory, and the like).

According to various embodiments of the present disclosure, the PCM unit 1630 of the battery pack 1600 is disposed to overlap with the top portion of the PCB 1660, and the socket device is disposed in parallel with the PCM unit 1630 at a side of the PCM unit 1630 so that the wiring space shortage of the PCB 1660, which is caused due to the PCM unit 1630 of the battery pack 1600, can be addressed.

Figure 10A:
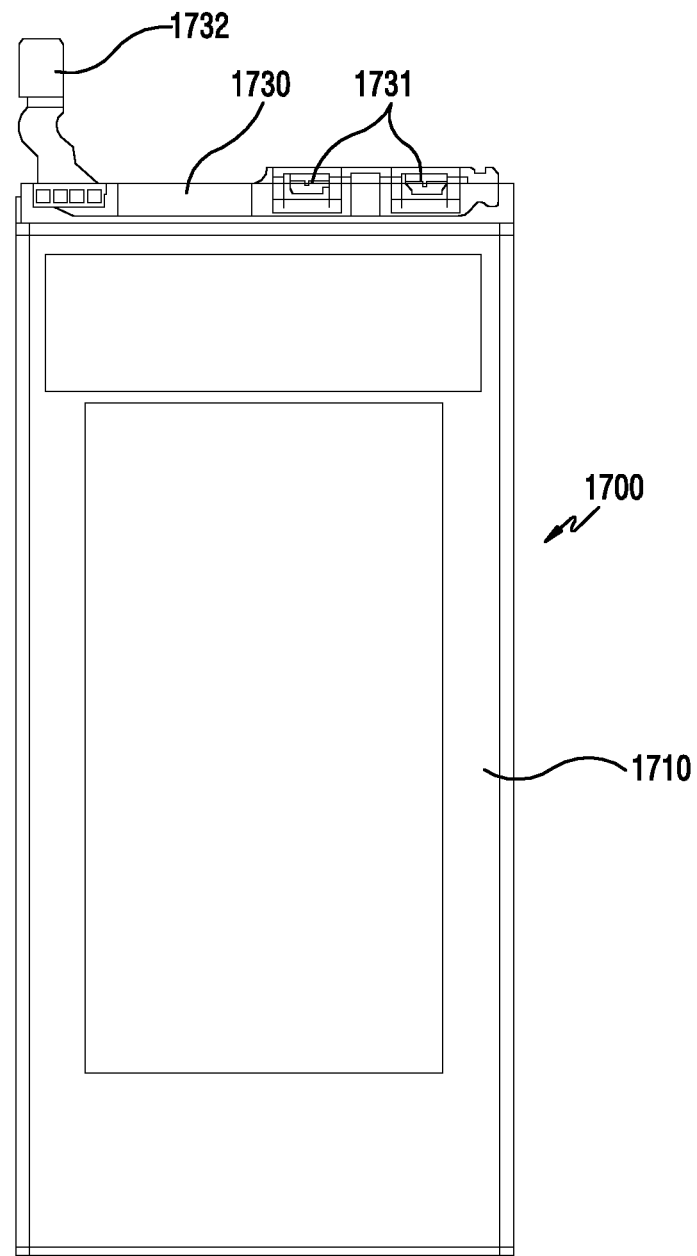
FIGS. 10A and 10B are views illustrating a configuration between a PCM unit of a battery pack and a PCB of an electronic device according to various embodiments of the present disclosure.
Figure 10B:
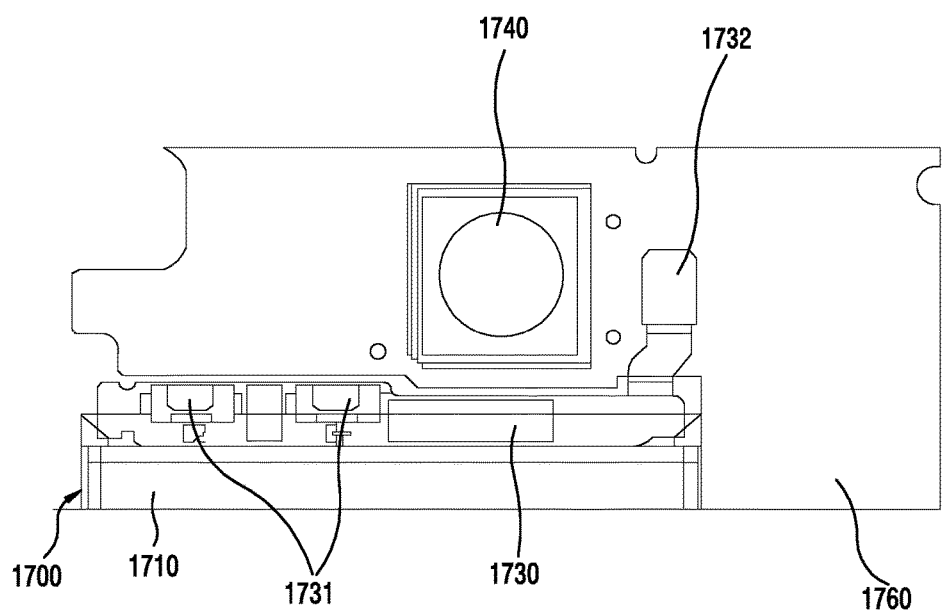

FIGS. 10A and 10B are configuration views illustrating a disposed relationship between a PCM unit of a battery pack and a PCB of an electronic device according to various embodiments of the present disclosure.

Referring to FIGS. 10A and 10B, a pouch terrace 1730 having a certain width and length may be formed on the top of a battery pack 1700. According to an embodiment of the present disclosure, a PCM unit 1731 may be disposed at a side of the pouch terrace 1730, and a connection terminal portion 1732 may be formed to be drawn out by a certain length so as to be electrically connected to a PCB 1760 at a side of the pouch terrace 1730. According to an embodiment of the present disclosure, the connection terminal portion 1732 may be disposed to be individually drawn out along the pouch terrace 1730 at a side of the pouch terrace 1730, rather than being directly drawn out from the PCM unit 1731.

According to various embodiments of the present disclosure, the PCM unit 1731 may be formed to have a relatively small height and disposed in parallel with the PCB 1760, and the connection terminal portion 1732 may be electrically connected to a side of the PCB 1760 to avoid the camera device 1740. Accordingly, the battery pack 1700 is disposed in a state where the connection terminal portion 1732 and the PCM unit 1731 are separated from the battery cell 1710 so that the volume of the PCM unit 1731 can be reduced so as to increase the capacity of the battery pack 1700 and the area of the PCB 1760 can be increased so as to secure a wiring space.

According to various embodiments of the present disclosure, there is provided a portable electronic device that may include a front glass cover that forms a front surface of the electronic device, a rear cover that forms a rear surface of the electronic device, a side surface unit that surrounds a space that is formed by the front glass cover and the rear cover, a display module that is positioned or embedded in the space and includes a screen area exposed through the front glass cover, a PCB that may be disposed between the display module and the rear cover, and includes an opening that may be at least partially closed, a battery that may be positioned or installed within the opening and interposed between the display module and the rear cover, and a PCM that may be positioned between the PCB and the display module, and may be disposed close to a side of the battery when viewed from a position above the PCB.

According to various embodiments of the present disclosure, the rear cover and the side surface unit may be formed integrally with each other.

According to various embodiments of the present disclosure, the rear cover and the side surface unit may include the identical material. According to an embodiment of the present disclosure, the material may be a metal.

According to various embodiments of the present disclosure, the electronic device may further include a camera module that may be disposed close to a side of the battery and a side of the PCM when viewed from a position above the PCB. The camera module includes a portion interposed between the display module and the rear cover. The camera module may include a lens that is exposed through the rear cover.

According to various embodiments of the present disclosure, the electronic device may further include a camera flash and/or a biometric sensor which may be disposed at the one side of the battery to at least partially overlap with the PCM when viewed from a position above the PCB, and are positioned between the PCB and the rear cover.

According to various embodiments of the present disclosure, the PCM and the camera module may be positioned side by side at a side of the battery when viewed from a position above the PCB, and at least a part of the camera flash and/or the biometric sensor and the PCM may be positioned at sides of the PCB, respectively, when viewed from a cross-section.

According to various embodiments of the present disclosure, the electronic device may further include a camera module that is formed through the PCB and disposed close to the one side of the battery when viewed from a position above the PCB, and includes a lens exposed through the rear cover. The PCM may have an L-shape that includes a first portion that may be positioned between the camera module and the battery when viewed from a position above the PCB.

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A portable electronic device comprising:
    a front glass cover that forms a front face of the portable electronic device;
    a rear cover that forms a rear face of the portable electronic device;
    a side portion that surrounds an inner space formed by the front glass cover and the rear cover;
    a display module embedded in the inner space and including a screen region that is exposed through the front glass cover;
    a printed circuit board (PCB) interposed between the display module and the rear cover, and including an opening that is at least partially closed, wherein the PCB is disposed in the inner space of the electronic device;
    a battery installed within the opening and disposed in the inner space for the electronic device; and
    a power control module (PCM) arranged to at least partially overlap the, and arranged adjacent to a side of the battery when viewed from a position above the PCB.

2. The portable electronic device of claim 1, wherein the rear cover and the side portion is integrally formed with each other.

3. The portable electronic device of claim 2, wherein the rear cover and the side portion include an identical material.

4. The portable electronic device of claim 3, wherein the material is a metal.

5. The portable electronic device of claim 1, further comprising:
a camera module including a portion arranged adjacent to the side of the battery and a side of the PCM when viewed from the position above the PCB, and interposed between the display module and the rear cover, and
the camera module includes a lens exposed through the rear cover.

6. The portable electronic device of claim 5, further comprising:
a camera flash and/or a biometric sensor that is arranged at the side of the battery and overlaps at least partially overlap with the PCM when viewed from the position above the PCB, the camera flash and/or the biometric sensor being interposed between the PCB and the rear cover.

7. The portable electronic device of claim 6, wherein the PCM and the camera module are positioned side by side at the side of the battery, and
at least a portion of the camera flash and/or the biometric sensor and the PCM are positioned at opposite sides of the PCB when viewed from a cross-section.

8. The portable electronic device of claim 1, further comprising:
a camera module that includes a lens provided through the PCB and arranged at the side of the battery when viewed from the position above the PCB, the lens being exposed through the rear cover,
wherein the PCM includes an L-shape including a first portion interposed between the camera module and the battery when viewed from the position above the PCB.

9. An electronic device comprising:
a housing;
a battery pack including a battery cell and a power control module (PCM) unit arranged to protrude in at least a portion of the battery cell, the battery cell and the PCM unit are disposed in an inside of the housing; and
a printed circuit board (PCB) arranged in the inside of the housing and including an opening that is at least partially closed,
wherein the battery cell is disposed within the opening of the PCB, and
wherein the PCM unit is arranged to at least partially overlap the PCB of the electronic device and arranged to avoid at least one electronic component mounted on the PCB.

10. The electronic device of claim 9, wherein the PCM unit is electrically connected to the PCB.

11. The electronic device of claim 9, wherein the PCM unit is arranged on a face that is equal to a face of the PCB on which the electronic component is mounted.

12. The electronic device of claim 9, wherein the PCM unit is mounted on a first face that is opposite to a second face of the PCB on which the electronic component is mounted.

13. The electronic device of claim 12, wherein the PCM unit is arranged to at least partially overlap with the electronic component when the PCM unit is arranged on the first face that is opposite to the second face of the PCB on which the electronic component is mounted.

14. The electronic device of claim 9, wherein the electronic component is at least one of a memory, a processor, various elements, a camera device, various sensor modules, and a flash device.

15. The electronic device of claim 9, wherein the battery pack is arranged as an embedded power source in the electronic device.

16. The electronic device of claim 12, wherein the PCM unit, the PCB, and the at least one electronic component are arranged such that a total mounting thicknesses thereof is not larger than a thickness of the battery cell.

* * * * *

UNITED STATES PATENT AND TRADEMARK OFFICE
CERTIFICATE OF CORRECTION

PATENT NO. : 10,051,096 B2
APPLICATION NO. : 14/996149
DATED : August 14, 2018
INVENTOR(S) : Sangin Baek et al.

Page 1 of 1

It is certified that error appears in the above-identified patent and that said Letters Patent is hereby corrected as shown below:

In the Claims

In Claim 1 in Column 20, Line 65, insert --PCB-- between "partially overlap the" and ", and arranged"

Signed and Sealed this
Thirteenth Day of August, 2019

Andrei Iancu
*Director of the United States Patent and Trademark Office*